(12) United States Patent
Ohashi

(10) Patent No.: US 7,782,213 B2
(45) Date of Patent: Aug. 24, 2010

(54) APPARATUS FOR PRODUCING RFID LABELS AND RFID LABEL

(75) Inventor: Tsuyoshi Ohashi, Hashima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 378 days.

(21) Appl. No.: 12/051,455

(22) Filed: Mar. 19, 2008

(65) Prior Publication Data

US 2008/0238689 A1 Oct. 2, 2008

(30) Foreign Application Priority Data

Mar. 26, 2007 (JP) ............................... 2007-080197

(51) Int. Cl.
*G08B 13/14* (2006.01)
*G06F 17/00* (2006.01)
(52) U.S. Cl. .............. 340/572.8; 340/572.1; 340/572.7; 235/375
(58) Field of Classification Search .............. 340/572.1, 340/572.7, 572.8; 235/375, 385, 451; 29/737; 156/384, 386, 387
See application file for complete search history.

(56) References Cited

U.S. PATENT DOCUMENTS

| | | | |
|---|---|---|---|
| 6,327,972 B2 * | 12/2001 | Heredia et al. ................. | 101/35 |
| 6,593,853 B1 * | 7/2003 | Barrett et al. ............. | 340/572.1 |
| 6,848,616 B2 * | 2/2005 | Tsirline et al. .............. | 235/449 |
| 6,899,476 B1 * | 5/2005 | Barrus et al. .................. | 400/76 |
| 7,439,858 B2 * | 10/2008 | Feltz et al. ............... | 340/572.1 |
| 2005/0077353 A1 | 4/2005 | Oishi et al. | |
| 2006/0097047 A1 | 5/2006 | Oishi et al. | |
| 2006/0109132 A1 | 5/2006 | Oishi et al. | |
| 2007/0164107 A1 | 7/2007 | Oishi et al. | |
| 2007/0273519 A1 | 11/2007 | Ichikawa et al. | |

FOREIGN PATENT DOCUMENTS

| | | |
|---|---|---|
| EP | 1522950 A2 | 4/2005 |
| JP | 2002033615 A | 1/2002 |
| JP | 2002151947 A | 5/2002 |
| JP | 2003-064598 A | 3/2003 |
| JP | 2005135354 A | 5/2005 |
| JP | 2006067478 A | 3/2006 |
| JP | 2006134247 A | 5/2006 |
| JP | 2006-209263 A | 8/2006 |
| JP | 2006311239 A | 11/2006 |
| JP | 2007-018518 A | 1/2007 |

OTHER PUBLICATIONS

Notice of Reasons for Rejection in Japanese Patent Application No. 2007-080197 (counterpart to above-captioned U.S. patent application) mailed Aug. 13, 2009 (partial translation).

* cited by examiner

*Primary Examiner*—Toan N Pham
(74) *Attorney, Agent, or Firm*—Baker Botts L.L.P.

(57) ABSTRACT

An apparatus for producing RFID labels includes a feeding-roller driving shaft configured to feed a base tape on which a RFID circuit element provided with a tag antenna having directivity with sensitivity to one side higher than that to the other side is arranged, a sensor configured to acquire information relating to directivity of the tag antenna, a lower apparatus antenna for radio communication with the RFID circuit element, and a print head configured to make a print on a cover film to be bonded to the base tape and controls the print head according to the directivity information acquired using the sensor.

14 Claims, 20 Drawing Sheets

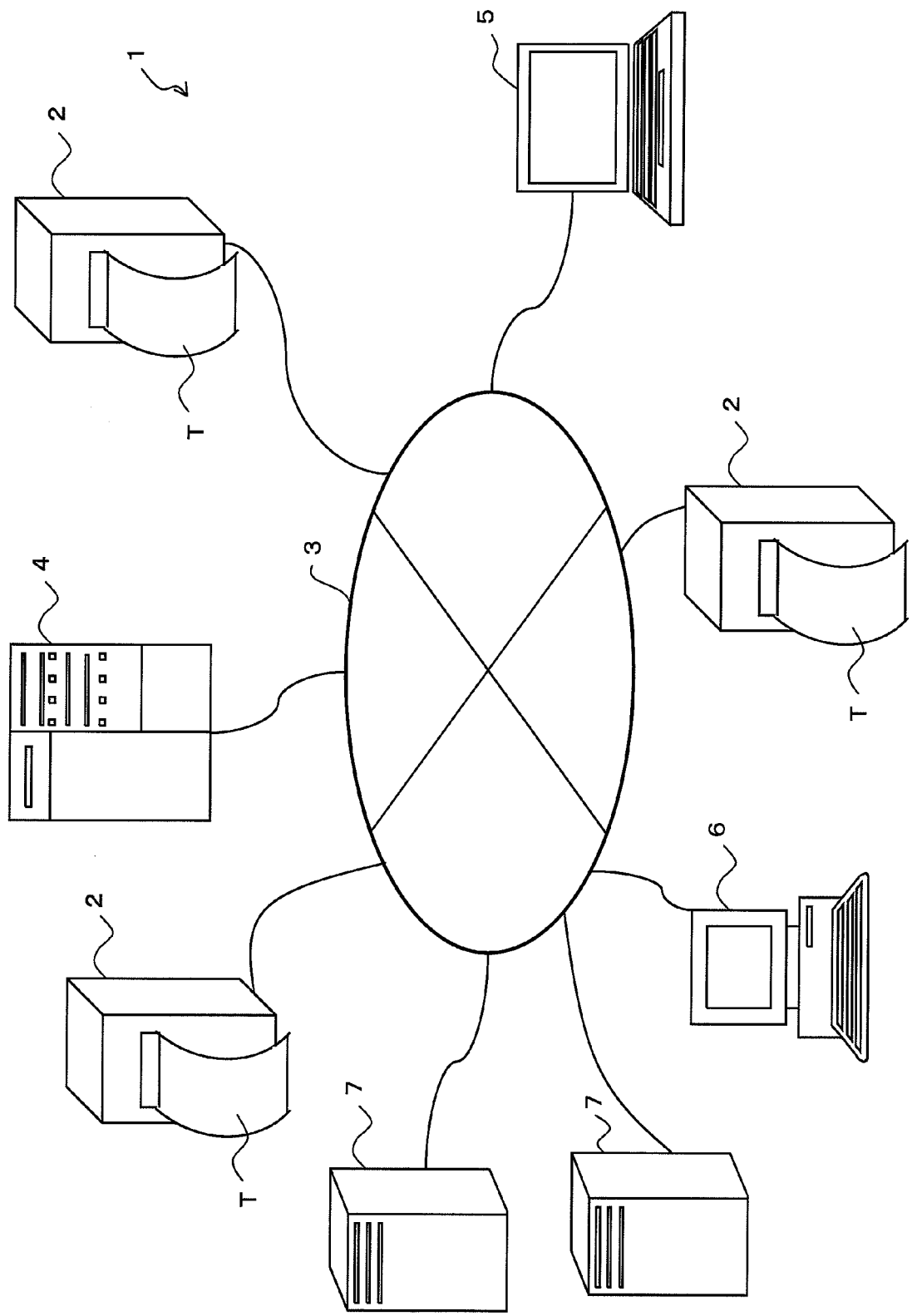
[FIG. 1]

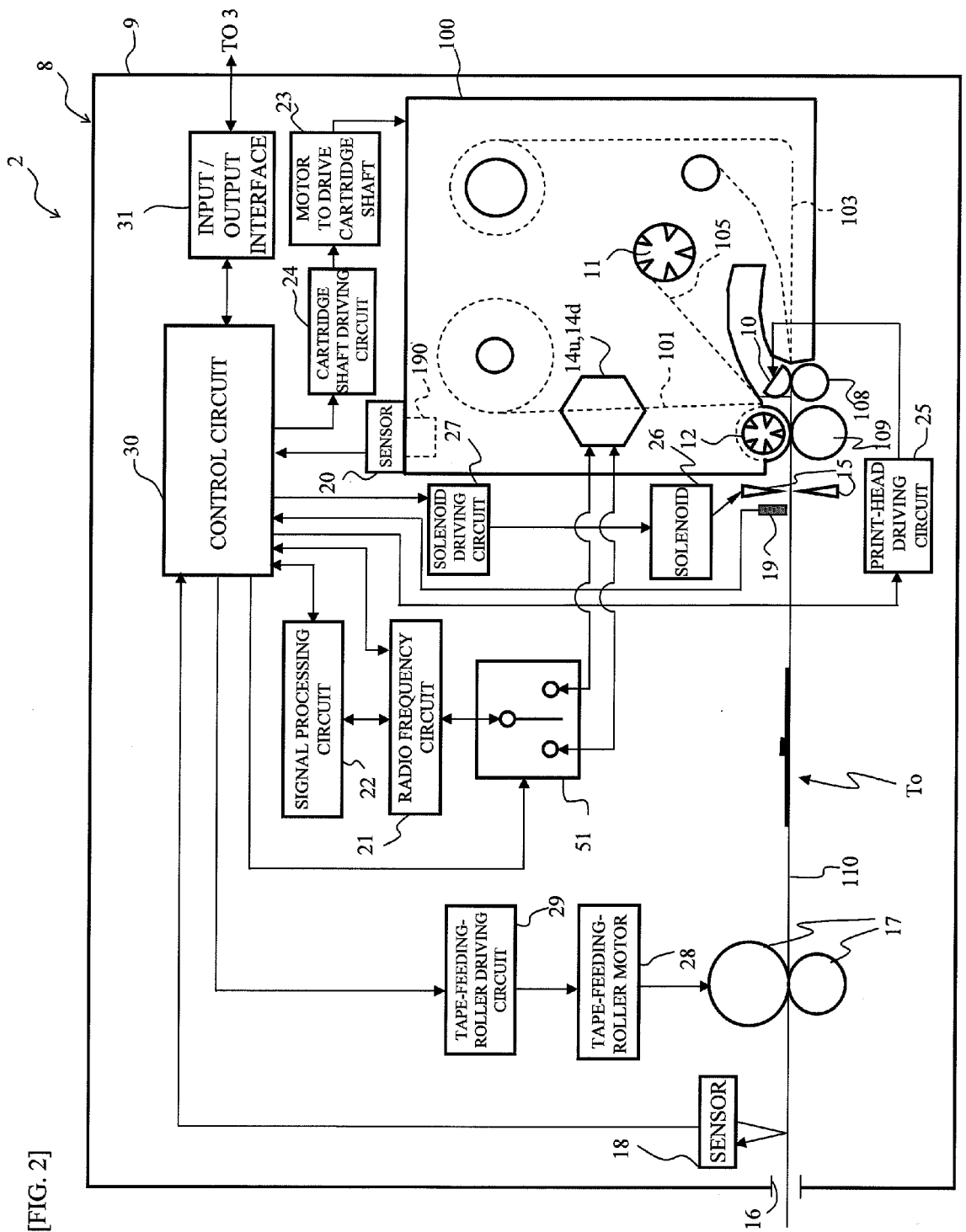
[FIG. 2]

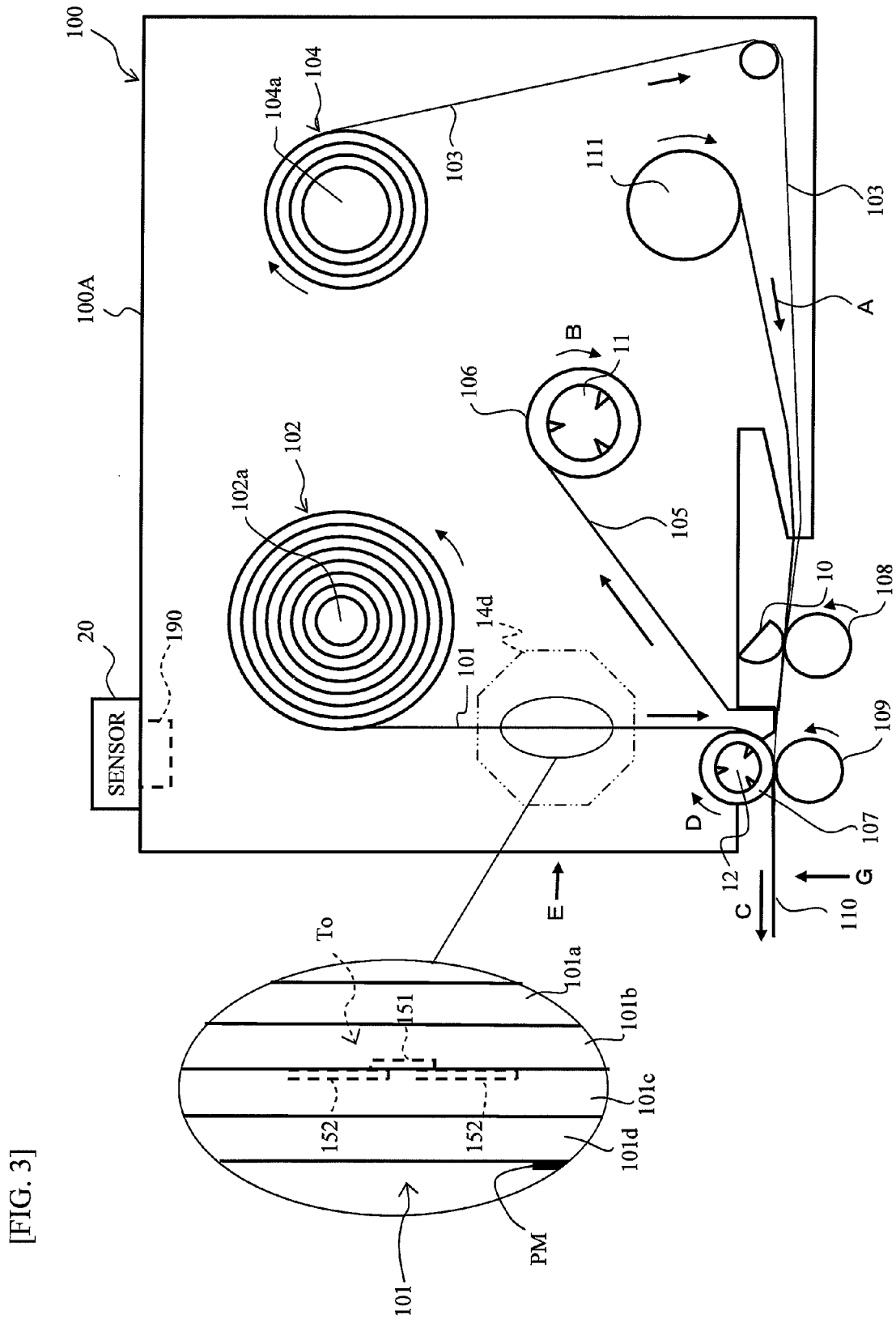
[FIG. 3]

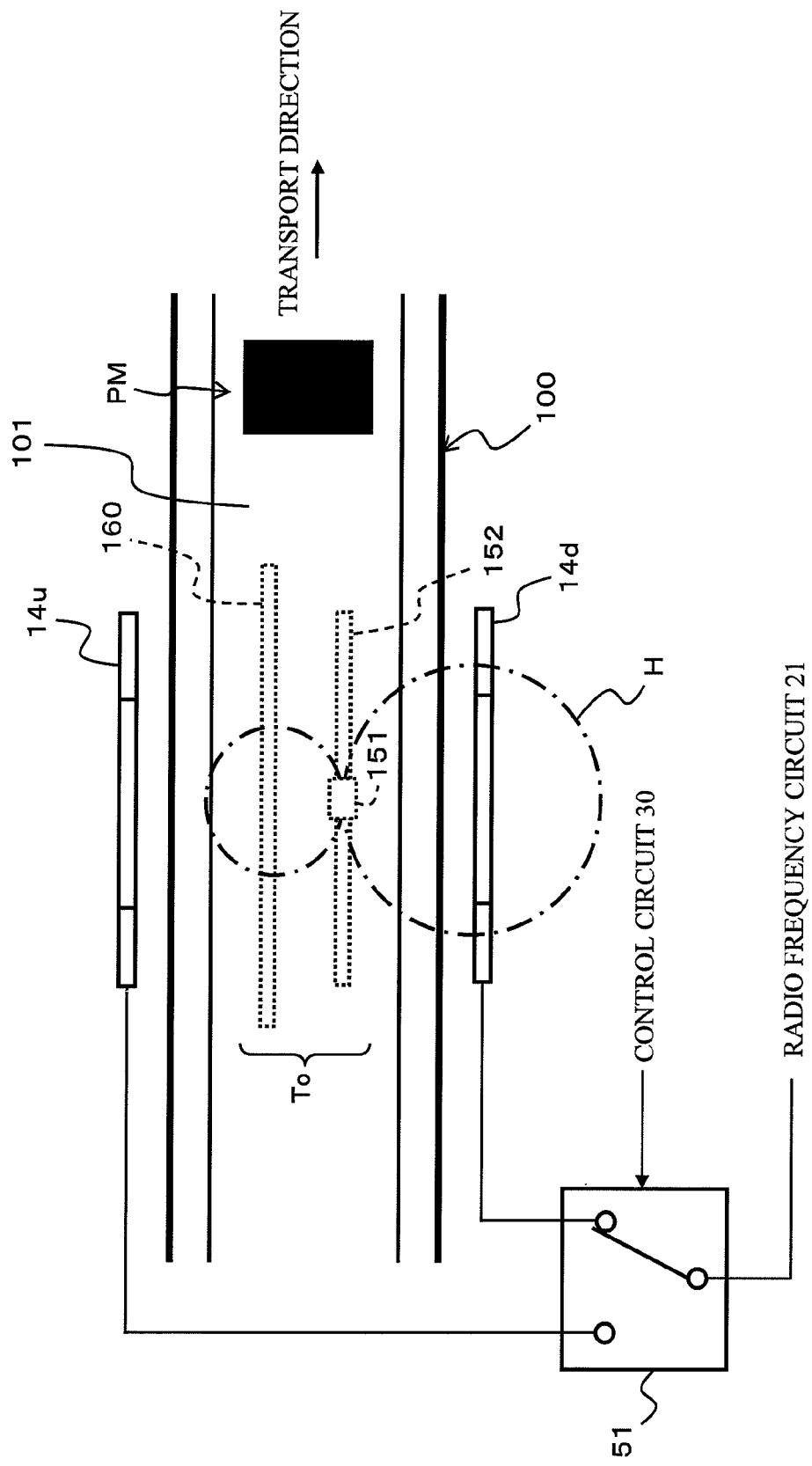
[FIG. 4]

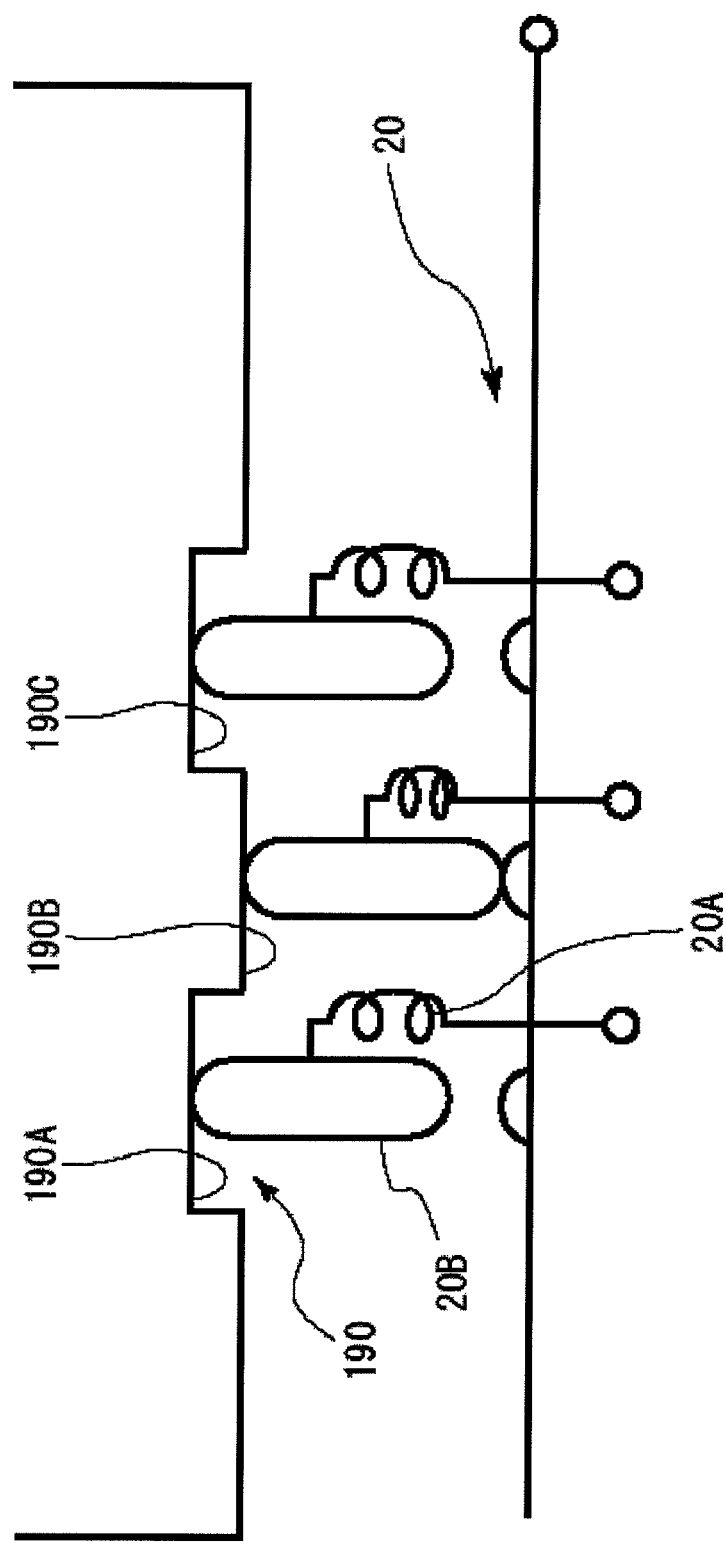
[FIG. 5]

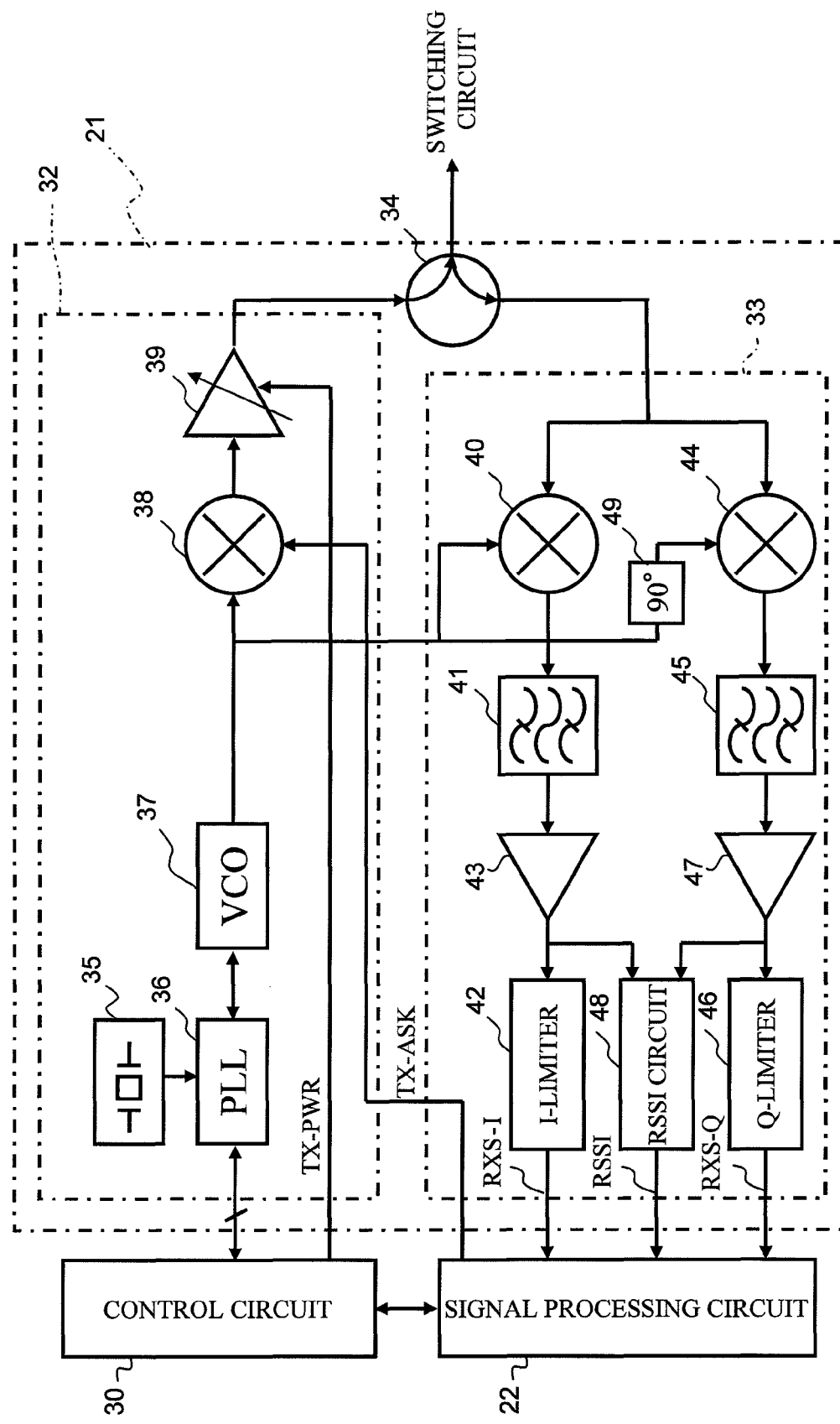
[FIG. 6]

[FIG. 7]
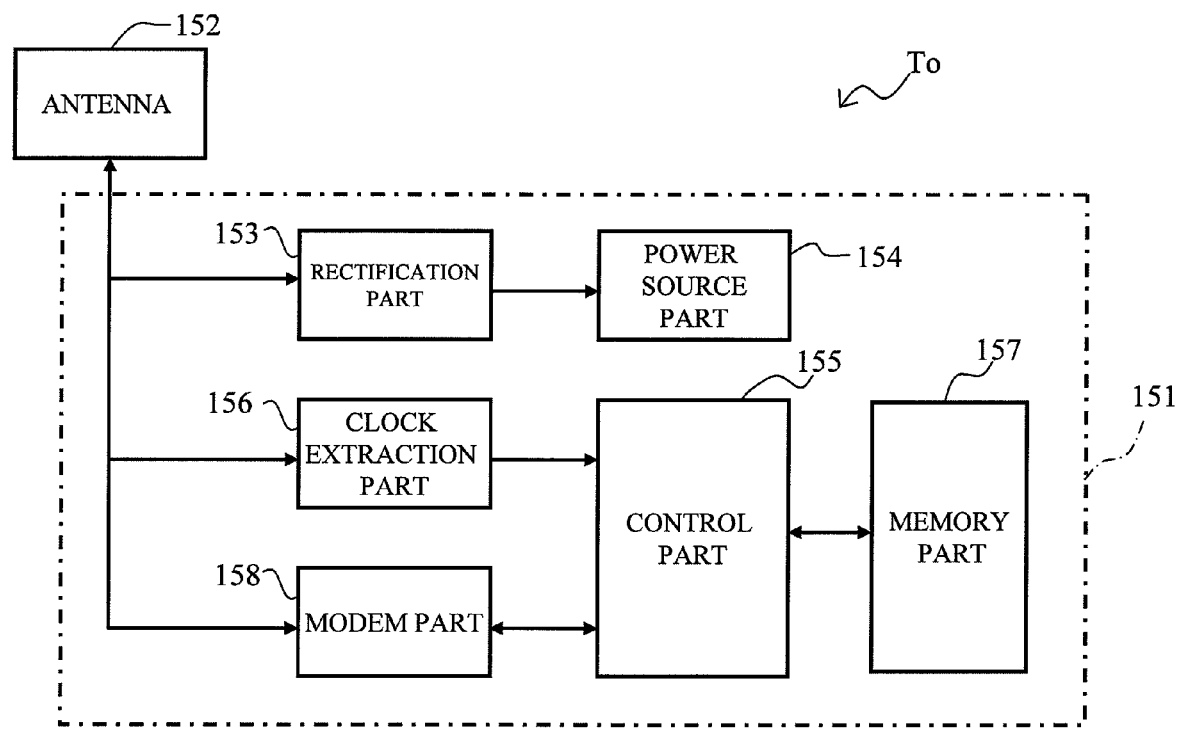

[FIG. 8A]
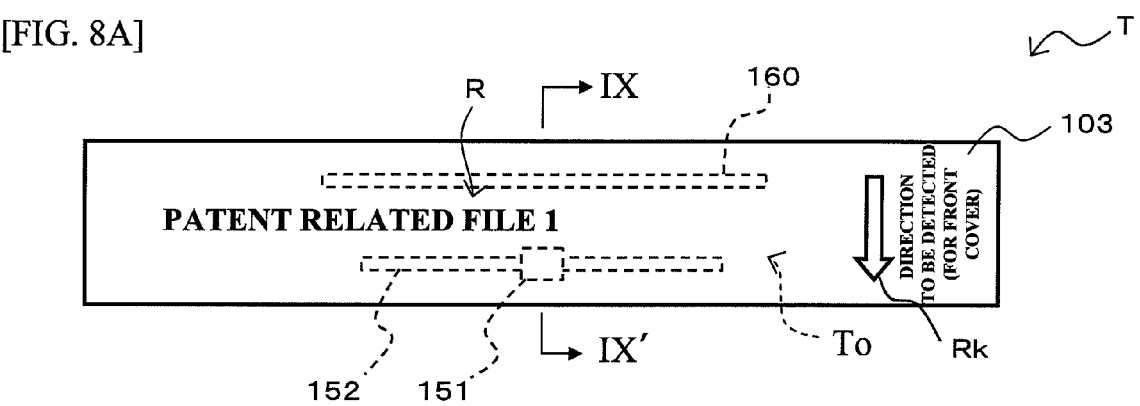
[FIG. 8B]
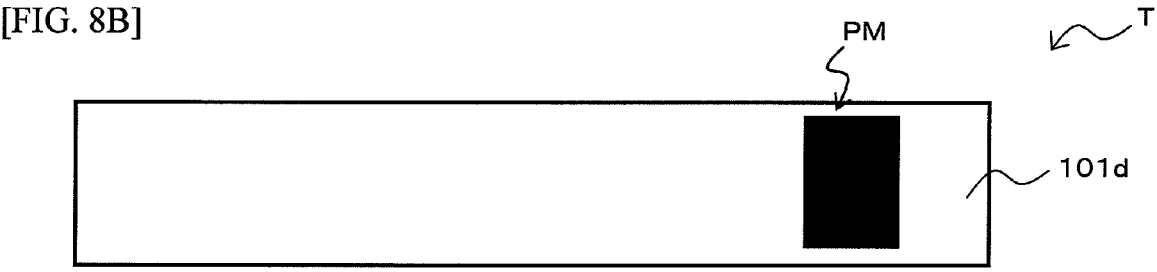

[FIG. 9]
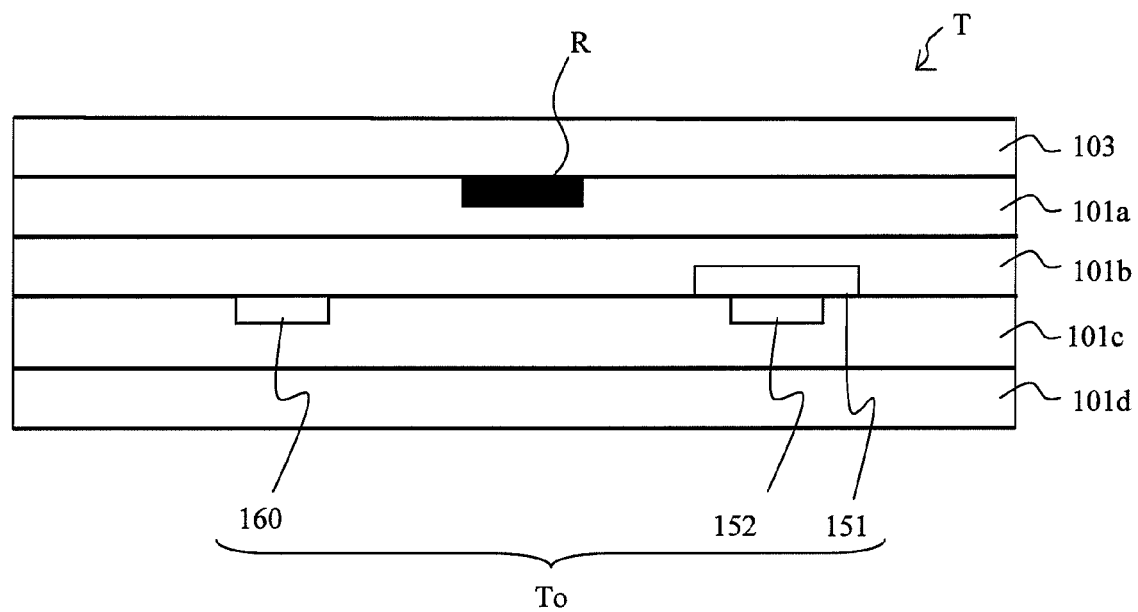

[FIG. 10]
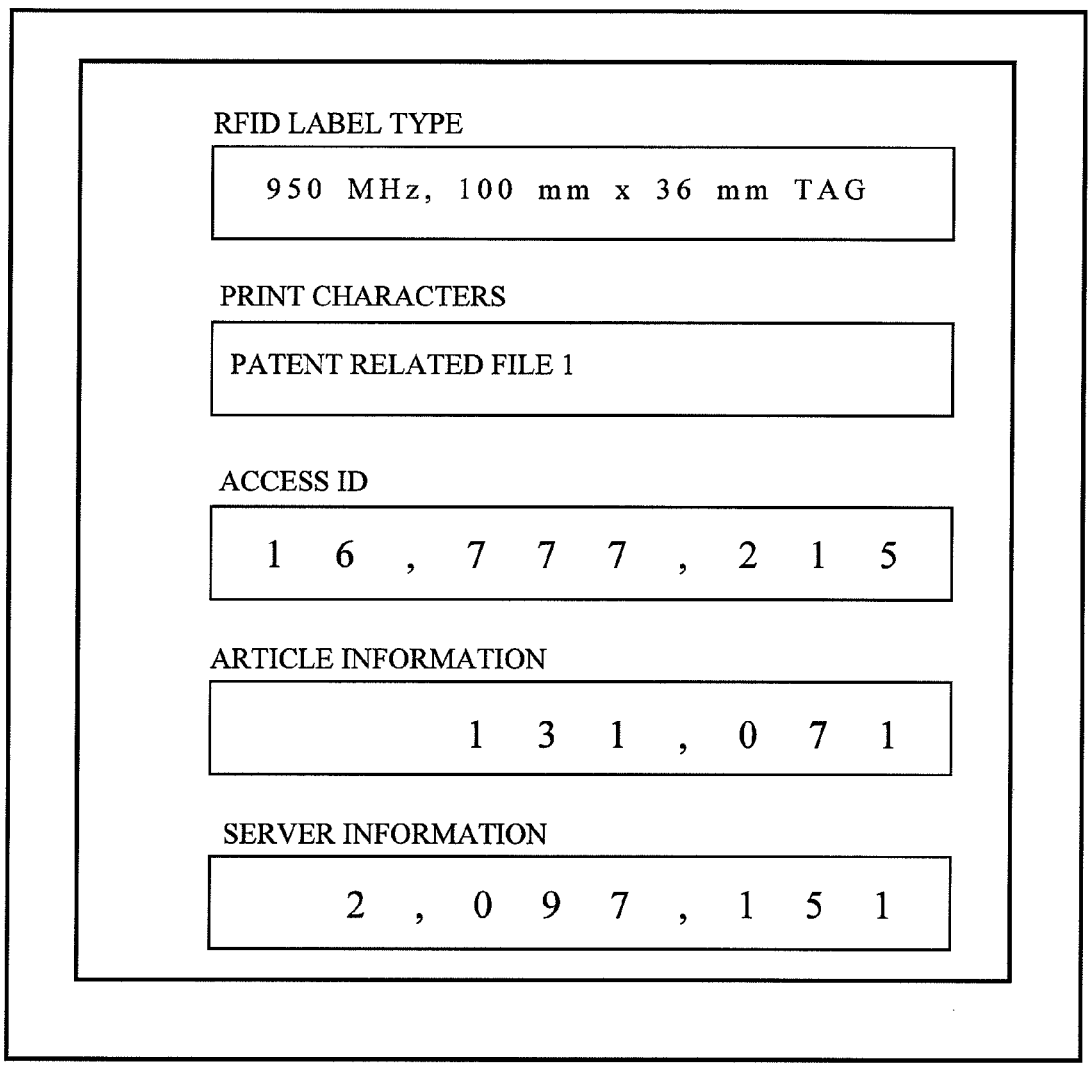

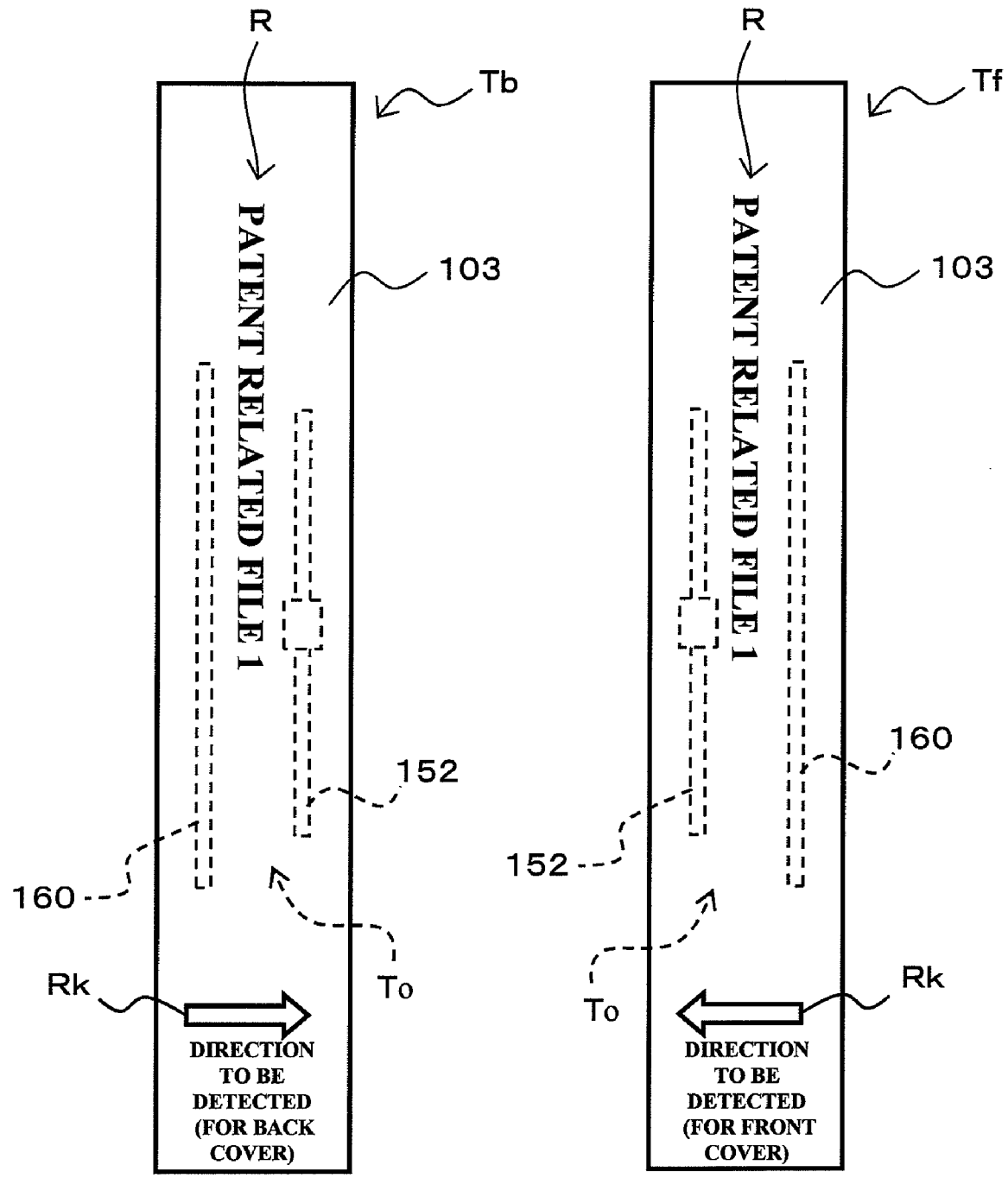
[FIG. 11A]     [FIG. 11B]

[FIG. 12]
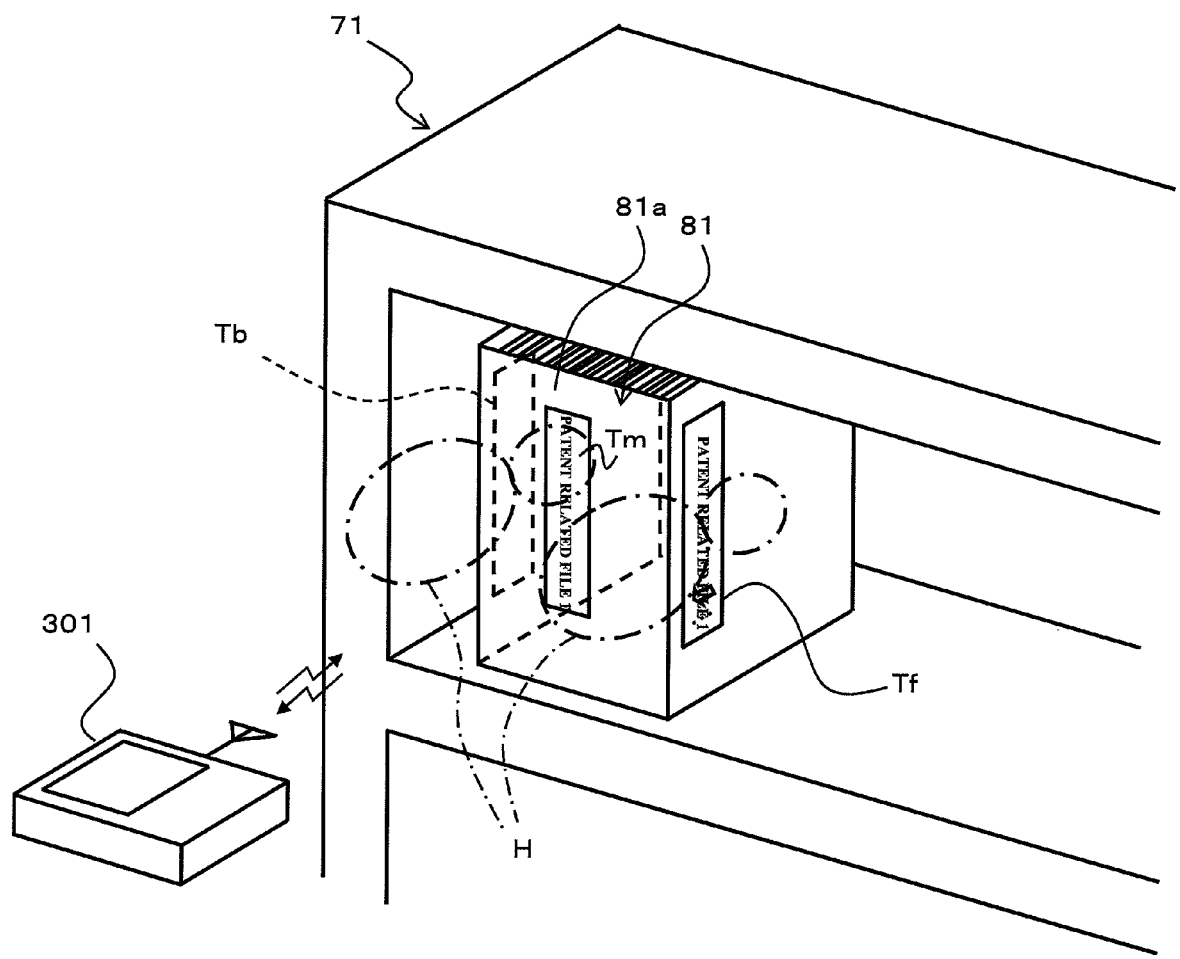

[FIG. 13A]
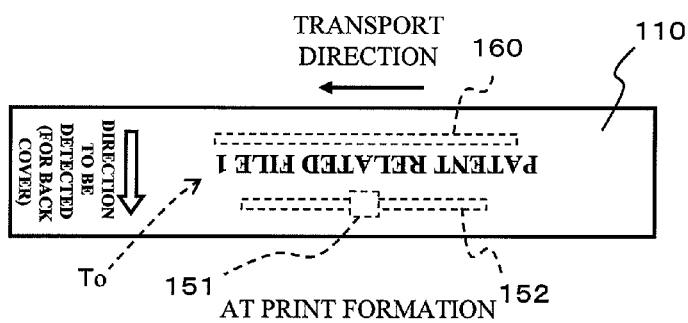
[FIG. 13B]
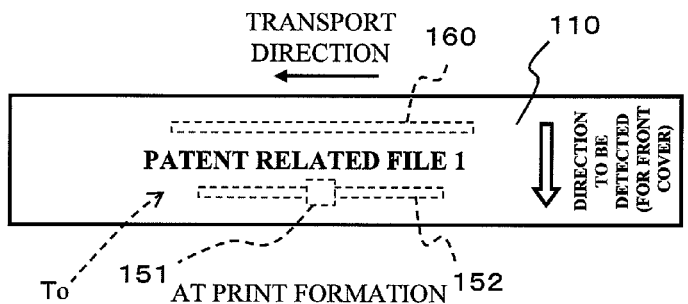
[FIG. 13C]
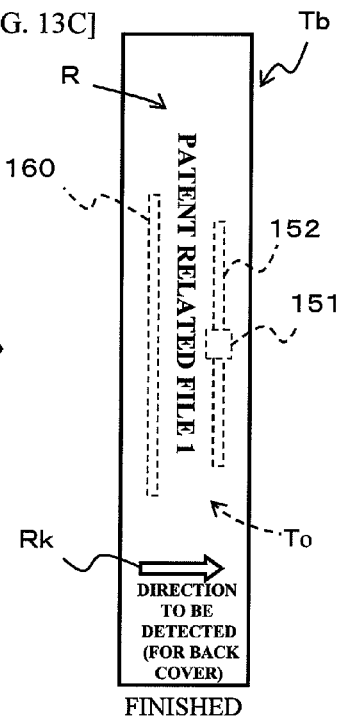
[FIG. 13D]
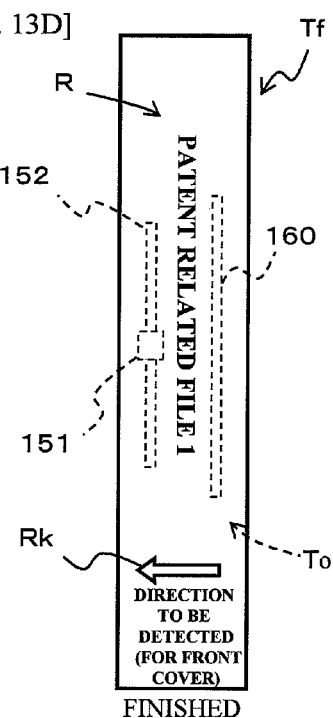

[FIG. 14]
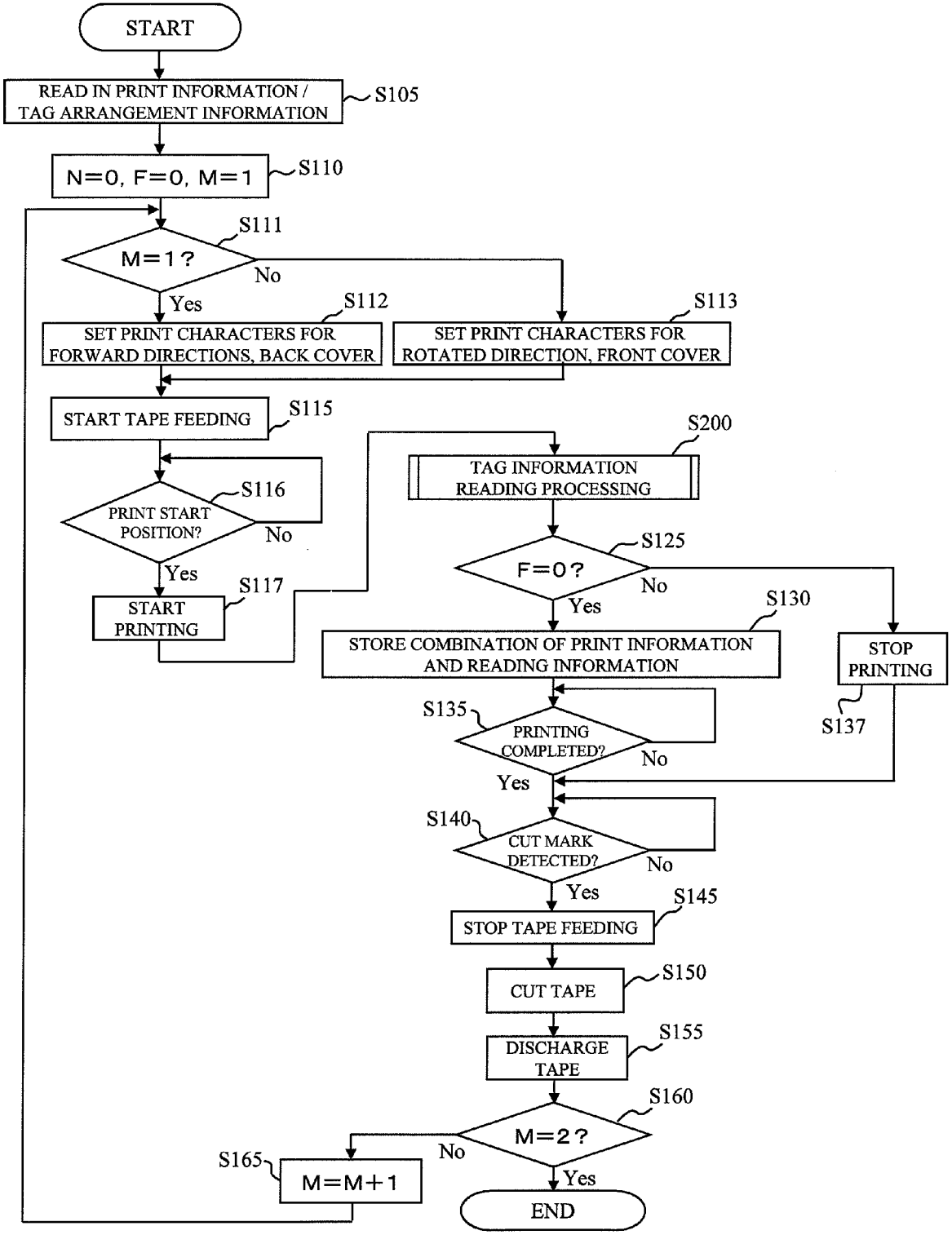

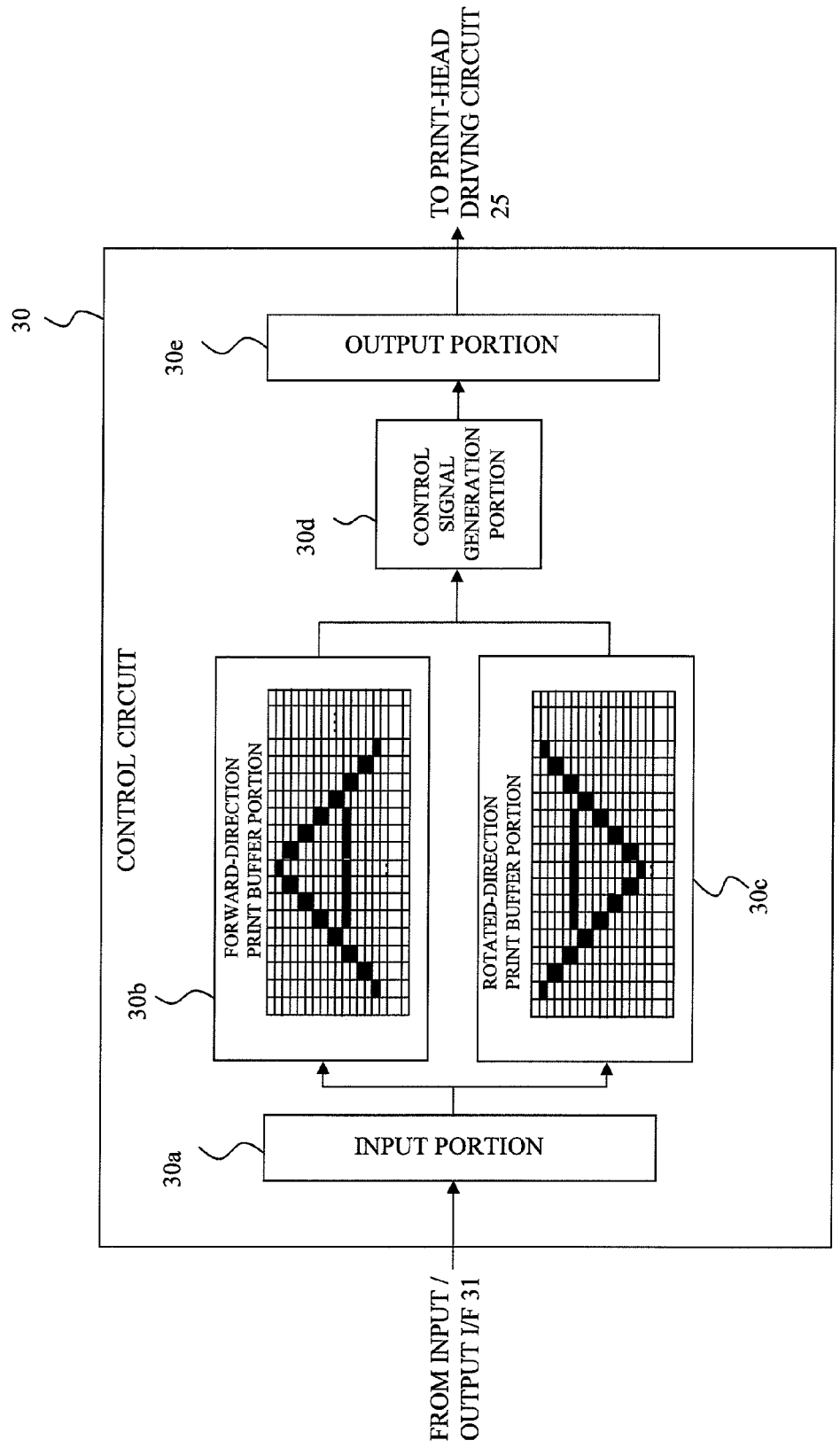
[FIG. 15]

[FIG. 16]
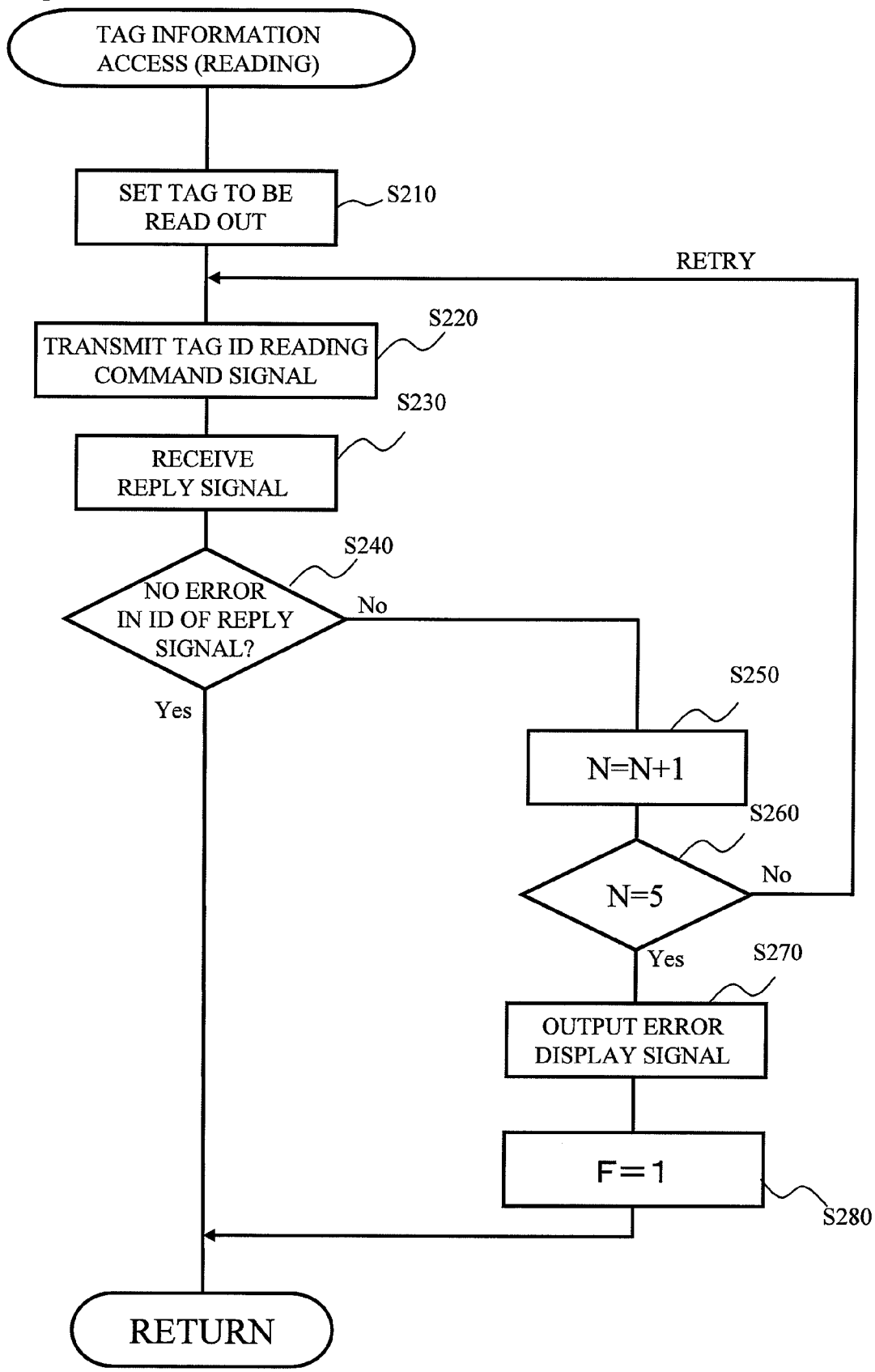

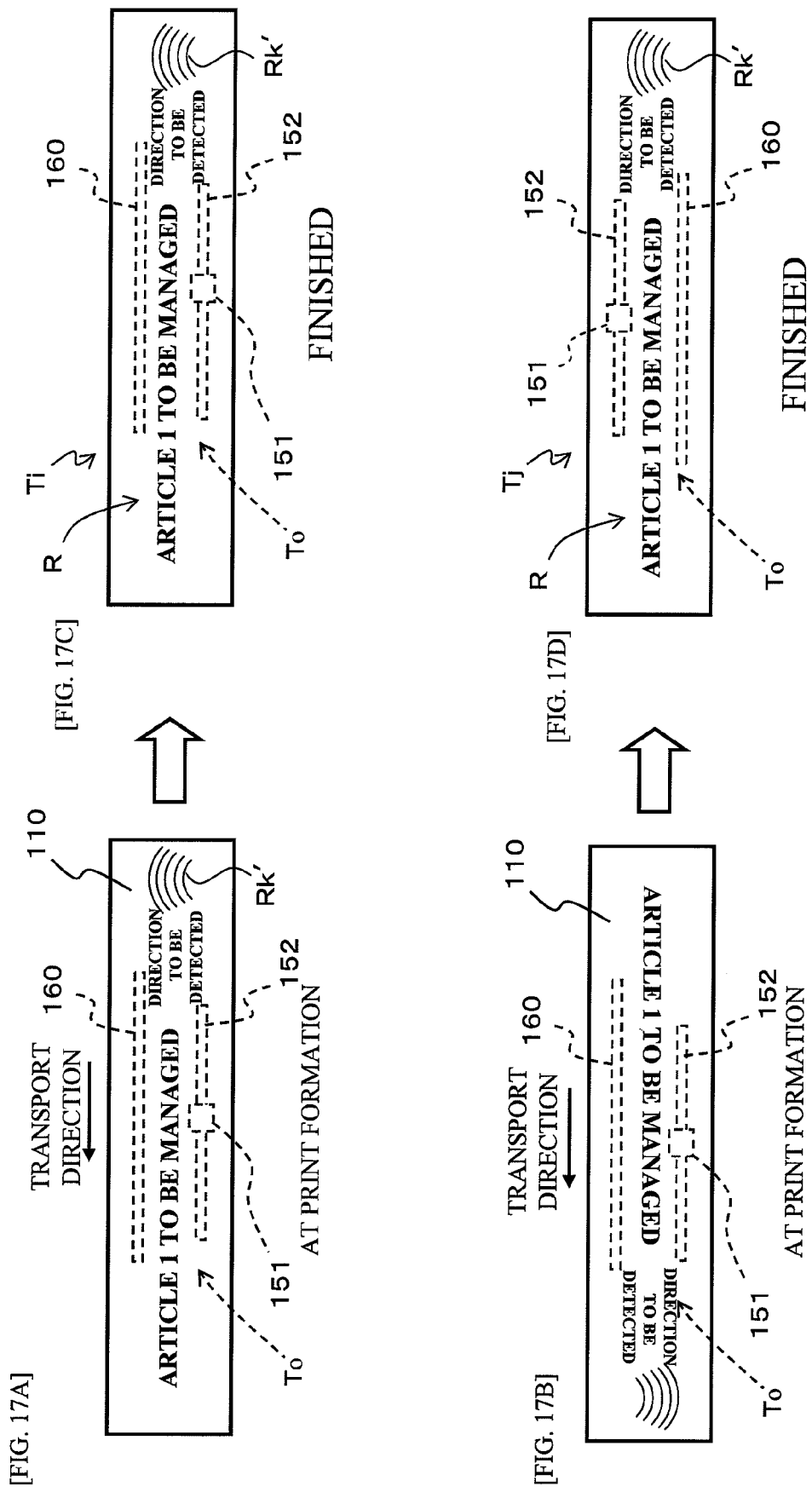

[FIG. 18]
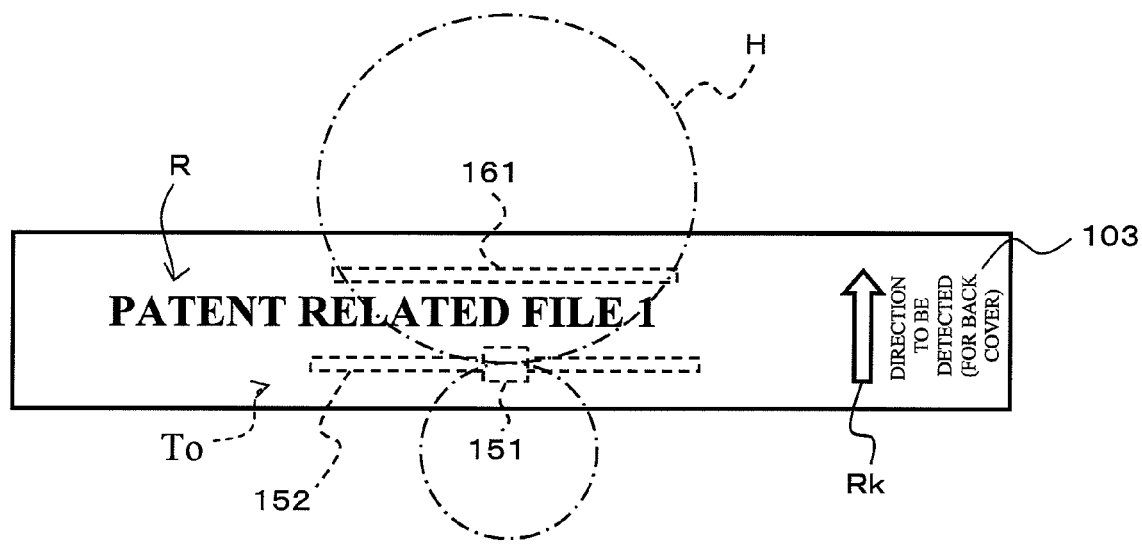

[FIG. 19]
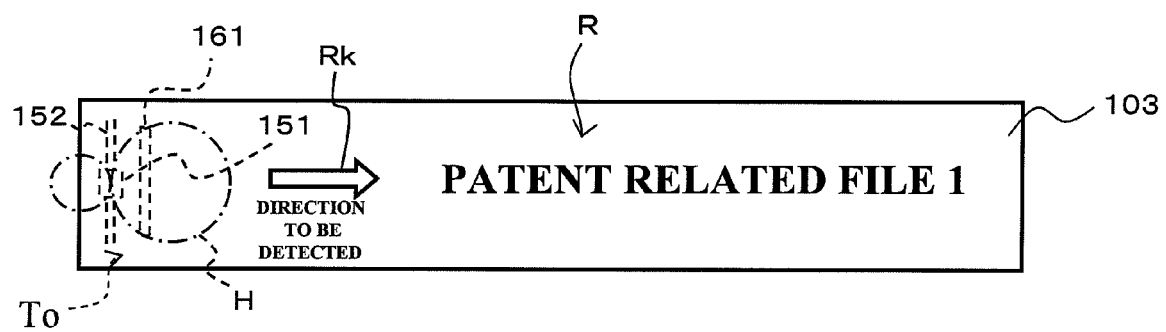

[FIG. 20A]
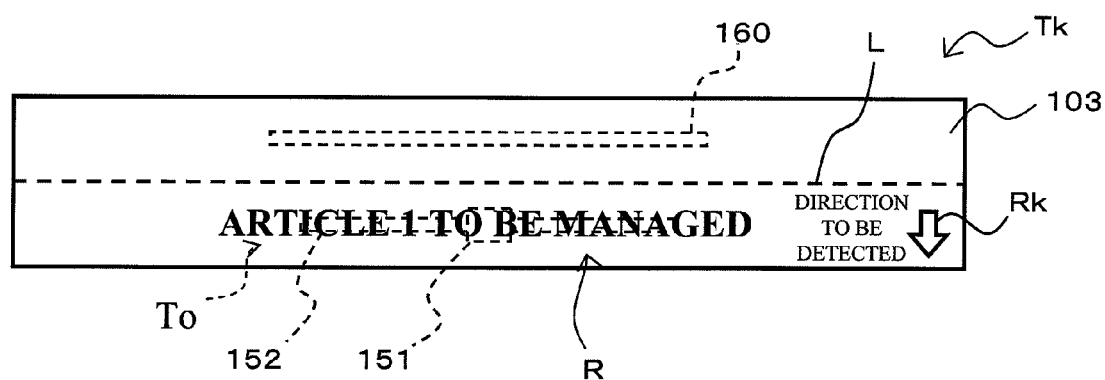
[FIG. 20B]
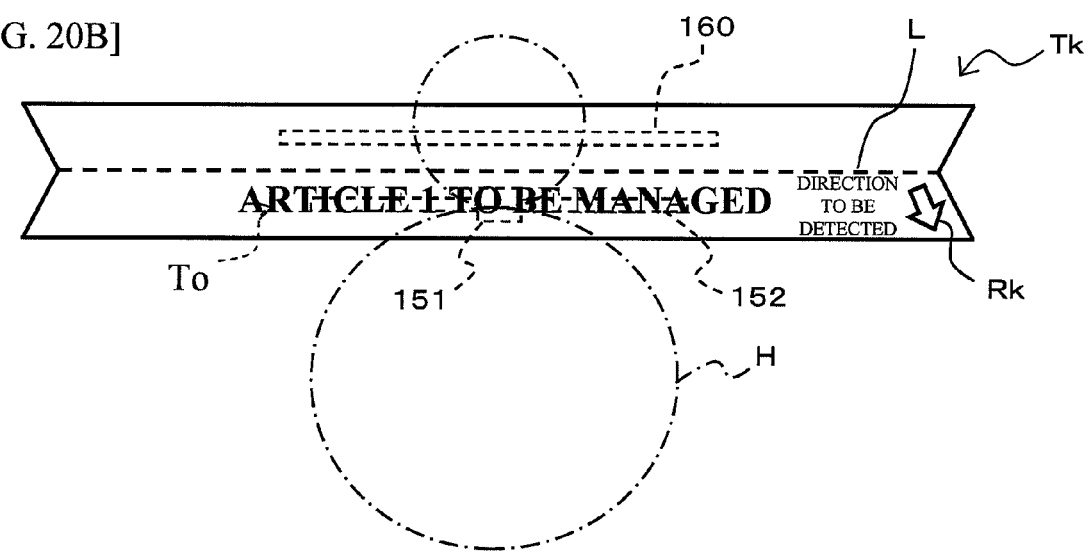

APPARATUS FOR PRODUCING RFID LABELS AND RFID LABEL

CROSS-REFERENCE TO RELATED APPLICATIONS

This application claims priority from JP 2007-80197, filed Mar. 26, 2007, the contents of which are hereby incorporated by reference.

BACKGROUND OF THE INVENTION

1. Field of the Invention

The present invention relates to an apparatus for producing RFID labels configured to produce a RFID label provided with a RFID circuit element capable of radio communication of information with the outside and to a produced RFID label.

2. Description of the Related Art

A RFID (Radio Frequency Identification) system configured to transmit and receive information contactlessly (electromagnetic coupling method using a coil, an electromagnetic induction method, an electric wave method or the like) with a RFID circuit element storing information is known.

In general, a RFID circuit element is provided with an IC circuit part storing information and a tag antenna for transmission and reception of information. This RFID circuit element is formed as a RFID label on a label-like material, and this RFID label is often affixed to a target article and the like for classification/organization of various documents and articles, for example. An example of such RFID label is the one described in JP, A, 2005-135354, for example.

This related art discloses configuration that when a RFID label is affixed to a target article, a maximum gain direction (direction with higher sensitivity) of the tag antenna of the RFID circuit element is matched with the direction of reading side by a reader.

SUMMARY OF THE INVENTION

In the above related art, a RFID label is configured using a RFID circuit element in which a direction with higher sensitivity and a direction with smaller sensitivity are present (that is, provided with communication directivity). When such RFID label is to be affixed to the target article, communication efficiency is improved by intentionally setting the direction with higher sensitivity of the RFID circuit element in a predetermined direction (so that the target article placed in a normal state is matched with the direction of reading-side by the reader).

However, in the above related art, once the RFID label is affixed to the target article with directivity pattern matching the above intention, the directivity pattern of the RFID circuit element (on which side the direction with higher antenna sensitivity is located) can not be visually recognized after affixation. Thus, when the target article is placed in a mode different from that expected at the beginning, a positional relation with the reader is changed or the like, communication matching the directivity pattern can not be performed and communication efficiency might be lowered.

The present invention has an object to provide an apparatus for producing RFID labels and a RFID label which can accurately recognize the directivity pattern of the produced label and favorably maintain the communication efficiency.

BRIEF DESCRIPTION OF THE DRAWING

FIG. 1 is a system block diagram illustrating a RFID tag manufacturing system to which an apparatus for producing RFID labels of an embodiment of the present invention is applied.

FIG. 2 is a conceptual block diagram illustrating a detailed structure of the apparatus for producing RFID labels.

FIG. 3 is an explanatory diagram for illustrating a detailed structure of a cartridge.

FIG. 4 is a view on arrow from an E direction in FIG. 3.

FIG. 5 is an explanatory diagram illustrating an example of configuration of a sensor.

FIG. 6 is a functional block diagram illustrating a detailed function of a radio frequency circuit.

FIG. 7 is a functional block diagram illustrating a functional configuration of a RFID circuit element.

FIGS. 8A and 8B are a top view and a bottom view illustrating an example of an appearance of a RFID label.

FIG. 9 is a diagram obtained by rotating a cross sectional plane of the IX-IX' section in FIG. 8 counterclockwise by 90 degrees.

FIG. 10 is a view illustrating an example of a screen displayed on a terminal or a general-purpose computer at an access to RFID tag information.

FIGS. 11A and 11B are diagrams illustrating an example of an appearance of a RFID label for back cover and an appearance of a RFID label for front cover, respectively.

FIG. 12 is a view illustrating a use example of the RFID label for front cover and the RFID label for back cover.

FIGS. 13A to 13D are top views illustrating the RFID label in two types of arrangement modes of print characters and RFID circuit elements in the case of a vertical print.

FIG. 14 is a flowchart illustrating a control procedure executed by a control circuit.

FIG. 15 is a functional block diagram illustrating functions relating to setting of a print character direction of the functions of the control circuit.

FIG. 16 is a flowchart illustrating a detailed procedure of Step S200 shown in FIG. 14.

FIGS. 17A to 17D are top views illustrating the RFID label in two types of arrangement modes of print characters and RFID circuit elements in the case of a lateral print.

FIG. 18 is a top view illustrating an example of an appearance of a RFID label provided with a wave director.

FIG. 19 is a top view illustrating a variation of a RFID label in which the RFID circuit element is disposed along the tape (label) width direction.

FIGS. 20A and 20B are a top view illustrating an example of the RFID label on which a folding line is printed and a view illustrating the folded state thereof, respectively.

DETAILED DESCRIPTION OF THE PREFERRED EMBODIMENTS

An embodiment of the present invention will be described referring to the attached drawings.

FIG. 1 is a system block diagram illustrating a RFID tag manufacturing system to which the apparatus for producing RFID labels of this embodiment is applied.

In the RFID tag manufacturing system 1 shown in FIG. 1, an apparatus 2 for producing RFID label according to this embodiment is connected to a route server 4, a terminal 5, a general-purpose computer 6, and a plurality of information servers 7 via a wired or radio communication line 3.

FIG. 2 is a conceptual block diagram illustrating a detailed structure of the apparatus 2 for producing RFID label.

In FIG. 2, in a main body 8 of the apparatus 2 for producing RFID label, a cartridge holder portion (not shown) as a recess portion is provided. On this cartridge holder portion, a cartridge (cartridge for including at least a RFID tag) 100 is detachably mounted.

The main body 8 has a housing 9, a print head (thermal head in this example) 10 as a printing device, a ribbon take-up roller driving shaft 11, a feeding-roller driving shaft (feeding device) 12, two apparatus antennas 14 (upper apparatus antenna 14*u* and a lower apparatus antenna 14*d* in this example), a cutter (cutter) 15, a carry-out roller 17, a tape end sensor 18, and a photo sensor (detecting device) 19.

The housing 9 is provided with the cartridge holder portion to which the cartridge 100 is fitted and constitutes an outline. The print head 10 makes a predetermined print (printing) on a cover film (print-receiving medium, print-receiving tape layer) 103. The ribbon take-up roller driving shaft 11 drives an ink ribbon 105 which has finished printing on the cover film 103. A feeding roller 107 (described later) driven by the feeding-roller driving shaft 12 bonds the cover film 103 to a base tape (tag medium) 101 and feeds it from the cartridge 100 as a tag label tape 110 with print (tag medium).

The upper apparatus antenna 14*u* and the lower apparatus antenna 14*d* are provided in the vicinity of a feeding path (from a feeding-out position from the roll to the feeding-roller driving shaft 12) of the base tape 101 fed out from a first roll 102, respectively. Since the upper apparatus antenna 14*u* and the lower apparatus antenna 14*d* (hereinafter referred to as "apparatus antennas 14*u*, 14*d*" as appropriate) are provided in an overlapping arrangement in a plan view in FIG. 2, only the lower apparatus antenna 14*d* is shown in FIG. 2 (See FIG. 4, which will be described later). The apparatus antennas 14*u* and 14*d* perform transmission and reception of a signal via radio communication using a predetermined radio frequency such as an UHF band with a RFID circuit element To (details will be described alter) provided at the base tape 101 (tag label tape 110 with print).

The cutter 15 cuts the tag label tape 110 with print at predetermined timing to a predetermined length and creates a label-like RFID label T (details will be described later). The carry-out roller 17 feeds and sends out the cut RFID label T to a carry-out exit 16. The tape end sensor 18 detects presence of the RFID label T at the carry-out exit 16. The photo sensor 19 is provided on the downstream side in the transport direction of the tag label tape 110 with print of the cutter 15 so as to face the feeding path (horizontal direction in FIG. 2) (so as to oppose the tape back face in this example). The photo sensor 19 detects a cut mark PM, which is an identifier provided at a separation sheet 101*d*, which will be described later and inputs a predetermined detection signal to a control circuit 30.

On the other hand, the main body 8 also has a radio frequency circuit 21, a signal processing circuit 22, a switching circuit 51, a motor 23 to drive cartridge shaft, a cartridge shaft driving circuit 24, a print-head driving circuit (driving signal generating device) 25, a solenoid 26, a solenoid driving circuit 27, a sensor (directivity information acquisition portion) 20, a tape-feeding-roller motor 28, a tape-feeding-roller driving circuit 29, and the control circuit 30.

The radio frequency circuit 21 is a circuit configured to make an access to the RFID circuit element To (for reading or writing) through the upper apparatus antenna 14*u* and the lower apparatus antenna 14*d*. The signal processing circuit 22 is a circuit configured to process a signal read out from the RFID circuit element To. The switching circuit 51 switches and connects either of the upper apparatus antenna 14*u* and the lower apparatus antenna 14*d* to the signal processing circuit 22 on the basis of the control signal from the control circuit 30.

The motor 23 to drive cartridge shaft is a pulse motor, for example, and drives the ribbon take-up roller driving shaft 11 and the tape-feeding-roller driving shaft 12. The cartridge shaft driving circuit 24 controls driving of the motor 23 to drive cartridge shaft. The print-head driving circuit 25 controls electricity to the print head 10. The solenoid 26 drives the cutter 15 to have it perform a cutting operation, and the solenoid driving circuit 27 controls the solenoid 26.

The sensor 20 detects information provided at a portion 190 to be detected (directivity information recording portion) provided at the cartridge 100. In this portion 190 to be detected, though details will be described later, an arrangement interval between the RFID circuit elements To in the base tape 101, tag attribute parameter information and the like including positional relation between the tag antenna and a reflector (derails will be described later) in the RFID circuit element To, tape width and the like are recorded.

The tape-feeding-roller motor 28 drives the feeding roll 17, and the tape-feeding-roller driving circuit 29 controls the tape-feeding-roller motor 28.

The control circuit 30 is a circuit that controls the entire operation of the apparatus 2 for producing RFID label via the radio frequency circuit 21, the signal processing circuit 22, the switching circuit 51, the cartridge shaft driving circuit 24, the print head driving circuit 25, the solenoid driving circuit 27, the tape-feeding-roller driving circuit 29 and the like. The control circuit 30 is a so-called microcomputer, though not shown in detail, and is constituted by a CPU, which is a central processing unit, ROM, RAM and the like. The control circuit 30 performs signal processing according to a program stored in the ROM in advance using the temporary storage function provided by the RAM. Also, the control circuit 30 is connected to a communication line, for example, via an input/output interface 31 and is capable of information exchange with the above-mentioned route server 4, other terminals 5, the general-purpose computer 6, the information server 7 and the like connected to the communication line.

FIG. 3 is an explanatory diagram for illustrating a detailed structure of the cartridge 100.

In FIG. 3, the cartridge 100 has a housing 100A, a first roll 102 (actually it is in a spiral state but shown as a concentric circle for simplification) arranged in the housing 100A, a second roll 104, a ribbon-supply-side roll 111, the ribbon take-up roll 106, and a feeding roller 107.

The first roll 102 has the band-like base tape 101 wound around a reel member 102*a*. On the base tape 101, a plurality of RFID circuit elements To is sequentially formed with a predetermined equal interval in the longitudinal direction.

The base tape 101 is in a four-layered structure in this example (See a partially enlarged diagram in FIG. 3). That is, the base tape 101 is constructed in lamination in the order of an adhesive layer 101*a*, a colored base film (tape base layer) 101*b*, an adhesive layer (affixing adhesive layer) 101*c*, and a separation sheet 101*d* from the side wound inside (right side in FIG. 3) toward the opposite side (left side in FIG. 3). The adhesive layer 101*a* and the adhesive layer 101*c* are made of an appropriate adhesive material.

The base film 101*b* is made of polyethylene terephthalate (PET) or the like. On the back side of the base film 101*b* (left side in FIG. 3), a tag antenna 152 configured to transmit and receive information is provided. In this example, the tag antenna 152 is a so-called straight-shaped dipole antenna provided with two antenna elements extended in both sides in the tape transport direction on the side of the tape transport direction (in other words, slightly biased to the tape width direction. See FIG. 4, which will be described later). Also, an IC circuit part 151 storing information capable of update (rewritably) is formed so as to be connected to the tag antenna 152. Moreover, the reflector for creating directivity (not shown in order to avoid complexity in FIG. 3; See FIG. 4) is provided in an arrangement parallel with the tag antenna 152. The tag antenna 152, the IC circuit part 151, and the reflector constitute the RFID circuit element To.

On the front side of the base film 101b (right side in FIG. 3), the adhesive layer 101a that bonds the cover film 103 later is formed, while on the back side of the base film 101b (left side in FIG. 3), the separation sheet 101d is bonded to the base film 101b by the adhesive layer 101c provided so as to include the RFID circuit element To. The separation sheet 101d is used when the RFID label T finally completed in the label state is affixed to a predetermined article or the like, and it is bonded to the article or the like by the adhesive layer 101c by peeling off the separation sheet.

The second roll 104 has the cover film 103 wound around a reel member 104a. The cover film 103 has substantially the same width as that of the base tape 101 and is constructed transparent in this example. After the cover film 103 is fed out of the second roll 104, the ribbon 105 is brought into contact with the back face of the cover film 103 by being pressed by the print head 10.

The ribbon-supply-side roll 111 and the ribbon take-up roller 106 are arranged on the back face side of the cover film 103 (that is, the side to be bonded to the base tape 101). The ribbon-supply-side roll 111 is to feed out the ink ribbon 105 (thermal transfer ribbon, however, it is not needed when the cover film is a thermal tape). The ribbon take-up roller 106 is driven to rotate by a driving force of the motor 23 to drive cartridge shaft, which is transmitted to the ribbon take-up roller driving shaft 11. By this operation, the ribbon take-up roller 106 drives the ink ribbon 105 and takes up the ink ribbon 105 after print.

The feeding roller 107 presses and bonds the base tape 101 and the cover film 103 together to have the tag label tape 110 with print and feeds the tape in a direction shown by an arrow A (=also functioning as a tape feeding roller). Also, the feeding roller 107 is driven to rotate by a driving force of the motor 23 to drive cartridge shaft transmitted to the feeding-roller driving shaft 12.

By employing a method of supplying the base tape 101 using the cartridge 100, replenishment and replacement of the base tape 101, which is a consumable supply, can be made easily.

In the cartridge 100 of the above configuration, when the cartridge 100 is attached to the cartridge holder portion of the main body 8 by an operator, a roll holder (not shown) is moved from a separated position to a contact position. Then, the cover film 103 and the ink ribbon 105 are held between the print head 10 and a platen roller 108. That is, the cover film 103 has the ink ribbon 105 brought into contact (by pressing of the print head 10) with its back face. Also, the base tape 101 and the cover film 103 are sandwiched between the feeding roller 107 and a sub-roller 109.

Then, the ribbon take-up roller 106 and the feeding roller 107 are driven to rotate by the driving force of the motor 23 to drive cartridge shaft in a direction shown by an arrow B and an arrow D, respectively, in synchronization with each other. At this time, the feeding roller driving shaft 12, the sub-roller 109 and the platen roller 108 are connected through the gear (not shown). That is, with the driving of the feeding roller driving shaft 12, the feeding roller 107, the sub-roller 109, and the platen roller 108 are rotated. As a result, the base tape 101 is fed out of the first roll 102 and supplied to the feeding roller 107 as mentioned above. On the other hand, the cover film 103 is fed out of the second roll 104. At this time, the plurality of heater elements of the print head 10 is electrified by the print-head driving circuit 25. As a result, a print R (See FIG. 8, which will be described later) is made on the back face of the cover film 103. The ink ribbon 105 finished with printing on the cover film 103 is wound up by the ribbon take-up roller 106. Then, the base tape 101 and the cover film 103 with which printing has been finished are bonded by the feeding roller 107 and the sub-roller 109 and integrated. This integrated base tape 101 and the cover film 103 are formed as the tag label tape 110 with print and fed out of the cartridge 100.

FIG. 4 is a view on arrow when seen from an E direction in FIG. 3.

In FIG. 4, the apparatus antennas 14u, 14d are provided in a plane crossing a tape surface of the feeding path of the base tape 101 (face at a right angle in this example; however, not limited to that, the crossing angle may be 45°, 60° or the like other than 90°). Also, the apparatus antennas 14u, 14d are provided in an arrangement opposing each other with the cartridge 100 between them.

At this time, the apparatus antennas 14u, 14d are constituted by a directional antenna (so-called patch antenna in this example), respectively, and has a directivity to the side opposing the cartridge 100. That is, the upper apparatus antenna 14u is, for example, provided with a micro-strip antenna element on the lower side (lower side in FIG. 4) and is a micro-strip antenna provided with a base plate on the side of a lid portion (not shown) covering the cartridge holder portion. Similarly, the lower apparatus antenna 14d is provided with a micro-strip antenna element on the upper side (upper side in FIG. 4) and is an embedded micro-strip antenna with a base plate exposed on the bottom face (not shown) of the cartridge holder portion.

The RFID circuit element To provided at the base tape 101 has a reflector 160 as mentioned above. The reflector 160 is provided at the same position as that of the tag antenna 152 in the transport direction of the base tape 101 and on one side in the tape width direction than the tag antenna 152 (upper side in FIG. 4, on the side of the upper apparatus antenna 14u) in this example. Also, the reflector 160 is formed in the straight line shape slightly longer than the entire tag antenna 152, which is a dipole antenna. In this example, the reflector 160 is provided in an arrangement in parallel with the tag antenna 152 and having the center position matching that of the tag antenna 152 in the tape transport direction. By this arrangement relation, in the RFID circuit element To, an effective communication region H (one-dot chain line portion in the figure) in radio communication is generated with being largely biased to the lower side (opposite side of the reflector 160, the side of the bottom face of the cartridge holder). That is, the direction of directivity where the sensitivity of the RFID circuit element To becomes higher (that is, the maximum gain direction) is generated downward in FIG. 4.

The directivity generating direction of the RFID circuit element To is common to all the RFID circuit elements To provided at the base tape 101 of the first roll 102. Thus, if the cartridge 100 of this example is attached to the cartridge holder portion, the switching circuit 51 is switching-controlled so that the lower apparatus antenna 14d is connected to the radio frequency circuit 21 (in other words, in compliance with the directivity of the RFID circuit element To provided at the base tape 101 of the attached cartridge 100, switching is made to the lower apparatus antenna 14d located on the side of the tag antenna 152 in the positional relation between the tag antenna 152 and the reflector 160). By this operation, through the lower apparatus antenna 14d corresponding to the downward directivity, assured radio communication can be performed with the RFID circuit element To. The information relating to such directivity direction of the RFID circuit element To is detected from the portion 190 to be detected through the sensor 20. The control circuit 30 switches the connection of the switching circuit 51 in correspondence with the above detected directivity information. Therefore, when the cartridge provided with the base tape 101 having the RFID circuit element To with the positional relation of the tag antenna 152 and the reflector 160 opposite the above (=when the reflector 160 is on the lower side and the tag antenna 152 is on the upper side in FIG. 4) is attached, in correspondence with the directivity of the RFID circuit element To, the switching is made to the upper apparatus antenna 14u located on the side of the reflector 160 in the positional relation between the tag antenna 152 and the reflector 160.

FIG. 5 is an explanatory diagram illustrating an example of configuration of the sensor 20.

In FIG. 5, the portion 190 to be detected has an irregular shape in general and is provided with identifiers 190A to 190C (cartridge identifier) made of a projection or recess. The identifiers 190A to 190C represent parameter information optimal to the RFID circuit element To in the cartridge 100 through the projection and recess. The parameter information includes communication parameters and tag attribute parameters, for example. The communication parameters are information relating to a frequency of wave used in the radio communication, communication protocols, transmission output and the like. The tag attribute parameters are information relating to a tape width of the base tape 101, an arrangement interval P of the RFID circuit element To in the tape longitudinal direction, positional relation between the reflector 160 and the tag antenna 152 in the tape width direction, corresponding directivity information, sensitivity of the RFID circuit element To, memory capacity of the IC circuit part 151 and the like. As mentioned above, the parameter information is usually all the same (common) to all the RFID circuit elements To provided at a single cartridge 100.

The sensor 20 is a mechanical switch in this example and has a spring member 20A and a contact 20B. That is, by urging and bringing the contact 20B into contact with the identifiers 190A to 190C by the spring member 20A, the irregular shape is detected. The contact 20B is arranged in correspondence with each projection and recess and outputs a detection signal to the control circuit 30, respectively. The control circuit 30 can get to know the parameter information in the cartridge 100 from the detection signal of the contact 20B indicating the irregular state of the identifiers 190A to 190C.

Since the parameter data on the cartridge 100 can be acquired from the cartridge 100 itself, labor of input by the operator for that is not needed any more, and the parameter data can be assuredly acquired.

FIG. 6 is a functional block diagram illustrating a detailed function of the radio frequency circuit 21.

In FIG. 6, the radio frequency circuit 21 includes a transmitting portion 32, a receiving portion 33, and a transmit-receive splitter 34.

The transmitting portion 32 transmits a signal to the RFID circuit element To through the switching circuit and either of the two apparatus antennas 14u, 14d. That is, the transmitting portion 32 has a crystal oscillator 35, a PLL (Phase Locked Loop) 36, a VCO (Voltage Controlled Oscillator) 37, a transmission multiplying circuit 38 (however, it may be replaced by an amplitude factor variable amplifier or the like in the case of amplitude modulation), and a variable transmission amplifier 39.

The crystal oscillator 35 generates a carrier wave for accessing (reading or writing) the RFID tag information stored in the IC circuit part 151 of the RFID circuit element To in response to a control signal (carrier-wave generation command signal) from the control circuit 30. The PLL (Phase Locked Loop) 36 generates a signal with a predetermined frequency by control of the control circuit 30.

The transmission multiplying circuit 38 modulates (in this example, amplitude modulation according to the "TX_ASK" signal supplied from the signal processing circuit 22) the carrier wave generated as described above based on a signal supplied from the signal processing circuit 22. In the case of the amplitude modulation, an amplitude factor variable amplifier or the like may be used. The variable transmission amplifier 39 amplifies the modulated waves (RFID tag information) modulated by the transmission multiplying circuit 38 with an amplification factor determined according to a "TX_PWR" signal supplied from the control circuit 30. The output from the variable transmission amplifier 39 is transmitted to the apparatus antennas 14u, 14d through the transmit-receive splitter 34 and supplied to the IC circuit part 151 of the RFID circuit element To. At this time, a UHF frequency band, a microwave band or a short-wave band is preferably used for the carrier wave generated as above. The RFID tag information is not limited to the signal modulated as above but it can be only a carrier wave in some cases.

For the receiving portion 33, a reflected wave from the RFID circuit element To received by either of the two apparatus antennas 14u, 14d is input. That is, the receiving portion 33 has an I-phase receiving signal multiplying circuit 40, an I-phase bandpass filter 41, an I-phase receiving signal amplifier 43, an I-phase limiter 42, a phase shifter 49, a Q-phase receiving signal multiplying circuit 44, a Q-phase bandpass filter 45, a Q-phase receiving signal amplifier 47, and a Q-phase limiter 46.

The I-phase receiving signal multiplying circuit multiplies the reflected wave from the RFID circuit element To received by the apparatus antennas 14u, 14d by the carrier wave generated as described above for demodulation. The I-phase bandpass filter 41 extracts only the signals within the necessary frequency band from the output of the I-phase receiving signal multiplying circuit 40. The I-phase receiving signal amplifier 43 amplifies the output of the I-phase bandpass filter 41. The I-phase limiter 42 further amplifies the output of the I-phase receiving signal amplifier 43 and converts it to a digital signal. The Q-phase receiving signal multiplying circuit 44 multiplies the reflected wave received from the RFID circuit element To through the apparatus antennas 14u and 14d by the carrier wave that has been delayed by a phase shifter 49 by 90° after having been generated as described above. The Q-phase bandpass filter 45 extracts only the signals within the necessary frequency band from the output of the Q-phase receiving signal multiplying circuit 44. The Q-phase receiving signal amplifier 47 amplifies the output of the Q-phase bandpass filter 45. The Q-phase limiter 46 further amplifies the output of the Q-phase receiving signal amplifier 47 and converts it to a digital signal. The signal "RXS-I" output from the I-phase limiter 42 and the signal "RXS-Q" output from the Q-phase limiter 46 are input to the signal processing circuit 22 for processing.

Furthermore, the outputs from the I-phase receiving signal amplifier 43 and the Q-phase receiving signal amplifier 47 are also input to an RSSI (Received Signal Strength Indicator) circuit 48, and the signal "RSSI" indicating the intensity of these signals is input to the signal processing circuit 22. As mentioned above, in the apparatus 2 for producing RFID label of this embodiment, the reflected wave from the RFID circuit element To is demodulated by the I-Q quadrature demodulation.

FIG. 7 is a functional block diagram illustrating a functional configuration of the RFID circuit element To.

In FIG. 7, the RFID circuit element To has the tag antenna 152 and the IC circuit part 151 connected thereto.

The tag antenna 152 performs transmission and receiving of a signal contactlessly with the apparatus antennas 14u, 14d on the side of the apparatus 2 for producing RFID label using a radio frequency with a predetermined frequency (UHF band, micro-wave band or short-wave band).

The IC circuit part 151 includes a rectification part 153, a power source part 154, a clock extraction part 156, a memory part 157, a modem part 158, and a control part 155.

The rectification part 153 is connected to the tag antenna 152 and rectifies a carrier wave (interrogating wave) received by the tag antenna 152. The power source part 154 accumulates energy of the interrogating wave rectified by the rectification part 153 to make it a driving power source of the IC circuit part 151. The clock extraction part 156 is connected to the tag antenna 152 and extracts a clock signal from the interrogating wave received by the tag antenna 152 and supplies it to the control part 155. The memory part 157 can store a predetermined information signal.

The modem part 158 is connected to the tag antenna 152 and demodulates a communication signal from the apparatus antennas 14u, 14d received through the tag antenna 152. Also, the modem part 158 modulates the interrogating wave received through the tag antenna 152 and resends it as a response wave from the tag antenna 152 based on a reply signal from the control part 155.

The control part 155 performs basic operation control of the entire RFID circuit element To through the rectification part 153, the clock extraction part 156, the modem part 158 and the like. For example, the control part 155 interprets a received signal demodulated by the modem part 158, generates a reply signal based on the information signal stored in the memory part 157, and outputs it to the modem part 158.

FIGS. 8A and 8B show diagrams illustrating an example of an appearance of the RFID label T formed as above. FIG. 8A is a top view (that is, a view seen from the side of the cover film 103). FIG. 8B is a bottom view (that is, a view seen from the side of the separation sheet 101d). FIG. 9 is a diagram acquired by rotating a cross sectional diagram of the IX-IX' section in FIG. 8A counterclockwise by 90 degrees.

In FIGS. 8A, 8B, and 9, the RFID label T is in the five-layered structure in which the cover film 103 is added to the four-layered structure shown in FIG. 3. That is, the RFID label T is made of five layers of the cover film 103, the adhesive layer 101a, the base film 101b, the adhesive layer 101c, and the separation sheet 101d from the cover film 103 side (upper side in FIG. 9) to the opposite side (lower side in FIG. 9). In the RFID label T, the RFID circuit element To (including the IC circuit part 151, the tag antenna 152, and the reflector 160) provided in the adhesive layer 101c, and the print R is made in a region on the back face of the cover film 103.

As the print R in this example, characters of "Patent Related file 1", and arrow (directivity index, directivity sign portion) Rk, characters of "direction to be detected", and characters of "(for front cover)" are printed.

The characters of "Patent Related file 1" indicate a type of a document file binder to which the RFID label T is to be affixed. The arrow Rk and the characters of "direction to be detected" indicate a direction to be detected, which will be described later. The characters of "(For Front Cover)" indicate a place to affix the RFID label T in the document file binder.

The print R is a vertical print with the tape transport direction (longitudinal direction) of the base tape 101 as the vertical direction of the characters. For example, when the cartridge 100 shown in FIG. 4 is used, the upstream side of the tape transport direction is the lower end side of the character string and the downstream side of the tape transport direction as the stared tip side of the character string. That is, in FIG. 8A, the tape transport direction is a direction to the left in the figure, while in FIG. 8B, the tape transport direction is a direction to the right in the figure.

On the surface of the separation sheet 101d, the cut mark PM is provided in advance by printing, for example. This cut mark PM is detected optically, for example, by the above-mentioned photo sensor 19 (See FIG. 2). The photo sensor 19 detects the cut mark PM during feeding of the tag label tape 110 with print as will be described later and inputs a corresponding detection signal to the control circuit 30. The control circuit 30 identifies an arrangement position of the RFID circuit element To based on the detection result and executes feeding control and positioning of the base tape 101 (tag label tape 110 with print) and printing control, cutting control, communication control and the like based on them.

FIG. 10 is a view illustrating an example of a screen displayed on the above-mentioned terminal 5 or the general-purpose computer 6 at information reading or writing with respect to the RFID circuit element To.

In FIG. 10, in this example, the type of the RFID label, the print characters R printed corresponding to the RFID circuit element To, an access (writing or reading) ID, which is an ID specific to the RFID circuit element To, an address of article information stored in the information server 7, storage destination address of the corresponding information in the route server 4 and the like can be displayed on the terminal 5 or the general-purpose computer 6. When the tag is to be created, the apparatus 2 for producing RFID label is operated by operation of the terminal 5 or the general-purpose computer 6. As a result, as mentioned above, the print characters R are printed on the cover film 103, and the RFID tag information such as the writing ID, article information and the like is written in the IC circuit part 151 of the RFID circuit element To (or the RFID tag information such as reading ID, the article information and the like stored in advance in the IC circuit part 151 is read out). Then, at this writing or reading, correspondence between the ID of the RFID circuit element To and information written in its IC circuit part 151 (or information read out by the IC circuit part 151) is stored in the above-mentioned route server 4 to be referred to as needed.

The most distinctive characteristic of the present embodiment is to create the RFID label T using the base tape 101 on which the RFID circuit element To provided with directivity with the sensitivity to one side getting higher than the other side is arranged. According to the information relating to the directivity, the print on the cover film 103 to be bonded to the base tape 101 is controlled. An example of the RFID label T to be affixed to a document file binder or book to be stored and managed in a book shelf will be described below.

FIGS. 11A and 11B are views illustrating an example of the RFID label created by the apparatus for producing RFID labels of this embodiment. In this example, a pair of the RFID label for front cover and the RFID label for back cover is shown. FIG. 11A shows an appearance of the RFID label for back cover, while FIG. 11B shows an appearance of the RFID label for front cover.

In FIGS. 11A and 11B, the RFID label for back cover (first vertical label) Tb and the RFID label for front cover (second vertical label) Tf both have the print R with the tape longitudinal direction as the vertical direction of characters in this example. These RFID labels Tb, Tf have the arrangement relation of the tag antenna 152 and the reflector 160 in the RFID circuit element To provided inside opposite to each other in the tape width direction. In correspondence with that, the print arrow Rk indicating the direction to be detected is also printed in the direction opposite to each other. The print indicating the affixation spot is separately printed as "(for back cover)" and "(for front cover)". The RFID label Tf for front cover shown in FIG. 11B is the same as that shown in FIGS. 8A and 8B.

The RFID label Tb for back cover shown in FIG. 11A has the reflector 160 provided on the left side in the figure of the tag antenna 152. As a result, a direction of directivity where sensitivity of the RFID circuit element To gets higher is an opposite direction (not particularly shown) toward the right side in the figure. The RFID label Tf for front cover shown in FIG. 11B has the reflector 160 provided on the right side in the figure of the tag antenna 152. As a result, the direction of directivity of the RFID circuit element To is an opposite direction (not particularly shown) toward the left side in the figure. The respective arrows Rk of the direction to be detected are prints indicating the direction matching the above directivity direction. The directivity direction of the RFID circuit element To provided at each of the RFID labels Tf, Tb are not visible, but by visually recognizing the print of the arrow Rk of the direction to be detected, the respective directivity directions can be recognized easily and assuredly.

FIG. 12 is a view illustrating a use example of the RFID label Tf for front cover and the RFID label Tb for back cover shown in FIGS. 11A and 11B.

In FIG. 12, a document file binder 81 (it may be a book. The same applies to the following) to be managed is placed and stored in a book shelf 71 in an arrangement that a spine label 81a is faced with the front side (front left in the figure) of the book shelf 71. That is, when seen from the front of the book shelf 71, any one of the document file binders 81 has its front covers located to the right (front right in the figure) and the back cover to the left (left depth side in the figure).

On the front cover side of the document file binder 81 (however, it opens from the left in this example), the RFID label Tf for front cover is affixed, and the RFID label Tb for back cover is affixed on the back cover side (they can be assuredly affixed by the print of "(for back cover)" and "(for front cover)"). At this time, as shown in the figure, by affixing the labels with vertical direction of the print characters matched with the vertical direction of the bookshelf 71 and the document file binder 81, the directivity direction of the RFID circuit element To of the RFID label Tf for front cover affixed on the front cover and the directivity direction of the RFID circuit element To of the RFID label Tb for back cover affixed on the back cover both go toward the front of the book shelf 71. In this example, a normal label Tm not provided with the RFID circuit element To is affixed to the spine label 81a.

The RFID label Tf for front cover may be affixed both to the front cover and the back cover, for example. In this case, the directivity direction can be provided both on the front side and the rear side of the book shelf 71. Therefore, the affixation is effective when the binders can be taken out both from the front and the rear of the book shelf 71 or when a case of placing the document file binder 81 in the opposite direction (the spine label 81a to the depth) by mistake is desirably handled (also when the RFID label Tb for back cover is affixed both to the front cover and the back cover). Also, in this case, the intensity of the sensitivity may be made different between each direction.

As mentioned above, the directivity direction of all the RFID labels T affixed to the document file binder 81 to be managed can be oriented to the same direction. By this arrangement, by arranging a reader 301 capable of reading information from the RFID circuit element To via radio communication in the front of the directivity direction, assured detection of the RFID labels Tf, Tb and information reading can be realized.

The apparatus 2 for producing RFID label of this embodiment creates a pair of RFID labels Tf, Tb as above at the same time as the RFID label T to be affixed to a single article to be managed.

FIGS. 13A and 13B are explanatory views illustrating a correspondence between the transport direction and the print character direction (direction of characters to be printed) when the pair of RFID labels Tf, Tb is to be created using the cartridge 100 shown in FIG. 4 (with the reflector 160 located on the upper side in FIG. 4 and the tag antenna 152 located on the lower side in the base tape 101). These figures correspond to arrow views from a G direction in FIG. 3. When the RFID label Tb shown in FIG. 13A is to be created, the print is made so that the downstream side in the tape transport direction is on the lower end side of the character string of the "Patent Related File 1". When the RFID label Tf shown in FIG. 13B is to be created, the print is made so that the upstream side in the tape transport direction is on the lower end side of the character string of the "Patent Related File 1". As mentioned above, the print is made in the mutually opposing arrangement modes for the base tape 101 of the same cartridge 100 between the creation of the RFID label Tb and creation of the RFID label Tf (arrangement mode rotated by 180°). As a result, in the finished state, the pair of RFID labels Tf, Tb with the arrangement of the reflector 160 and the tag antenna 152 in the tape width direction opposite to each other can be created (See FIGS. 13C and 13D). In FIG. 4, when the cartridge 100 provided with the base tape 101 with the reflector 160 located on the lower side and the tag antenna 152 on the upper side, which is opposite to the above, is used (in this case, communication is performed through the upper apparatus antenna 14u), it is only necessary to have the print modes in FIGS. 13A and 13B opposite to each other.

FIG. 14 is a flowchart illustrating a control procedure executed by the control circuit 30 when the pair of RFID labels Tf, Tb in the above-mentioned arrangement modes is created. In this example, creation of the (unwritable) RFID label only by reading information from the RFID circuit element To will be described as an access to the RFID circuit element To. Also, the cartridge 100 shown in FIG. 4 (provided with the base tape 101 having the tag antenna 152 located on the lower side and the reflector 160 on the upper side in FIG. 4) is used for an example for explanation.

In FIG. 14, this flow is started when a RFID label creation start operation is performed by the terminal 5 or the general-purpose computer 6, for example. First, at Step S105, print information to be printed on the RFID labels Tf, Tb by the print head 10 input and operated through the terminal 5 or the general-purpose computer 6 as an operating device is read in through the communication line 3 and the input/output interface 31. Also, through the sensor 20, various types of information relating to the base tape 101 (the arrangement relation between the tag antenna 152 and the reflector 160, that is, including directivity information) is read in from the portion 190 to be detected of the cartridge 100.

Then, at Step S110, there is no response from the RFID circuit element To, and the variable N for counting the number of retry times (number of access retry times) is initialized to 0. Also, a flag F indicating if the communication is favorable or defective is initialized to zero, and a variable M indicating if it is for front cover or for back cover is initialized to one (=for back cover).

Next, at Step S111, it is determined if the variable M is one or not, that is, the RFID label Tb for back cover is to be created or not. If the variable M is one, the determination is satisfied, and the routine goes to Step S112. At Step S112, based on the tag arrangement information input at Step S105, the character direction to be printed is set to a forward direction, and the print contents are set for the contents for the back cover. Here, the forward direction is a print character direction such that the print characters are in the normal arrangement relation (relation that the downstream side in the tape transport direction is on the lower end side of the character string as shown in FIG. 13A). Then, the routine goes to Step S115.

On the other hand, at the determination at Step S111, if the variable M is two, the determination is not satisfied, and the routine goes to Step S113. At Step S113, based on the tag arrangement information input at Step S105, the character direction to be printed is set to a rotated direction, and the print contents are set for the contents for the front cover. Here, the rotated direction is a print character direction such that the print characters are in the arrangement relation obtained by rotating the normal arrangement by 180 degrees (relation that the upstream side in the tape transport direction is on the lower end side of the character string as shown in FIG. 13B). Then, the routine goes to Step S115.

At the subsequent Step S115, a control signal is output to the cartridge shaft driving circuit 24, and the ribbon take-up roller 106 and the feeding roller 107 are driven to rotate by a driving force of the motor 23 to drive cartridge shaft. By this operation, the base tape 101 is fed out of the first roll 102 and supplied to the feeding roller 107, while the cover film 103 is fed out of the second roll 104. Moreover, a control signal is output to the tape-feeding-roller motor 28 through the tape-feeding-roller driving circuit 29 so as to rotate and drive the feeding roller 17. At this time, the print head 10 has not been electrified yet, and print is not made on the cover film 103.

At the subsequent Step S116, it is determined if the print start position has been reached by the feeding at Step S115, that is, if a fed amount of the base tape 101 and the cover film 103 (and the tag label tape 110 with print in which they are bonded together) fed at Step S115 have reached a predetermined amount. The determination of the fed amount at this time can be made, for example, by counting the number of pulses output by the cartridge shaft driving circuit 24 driving the motor 23 to drive cartridge shaft, which is a pulse motor, based on a detection result of the cut mark PM provided at the RFID label T created before the RFID label T being created at present by the photo sensor 19. If the determination is satisfied, the routine goes to Step S117.

At Step S117, a control signal (For details, see FIG. 15, which will be described later) based on the print character direction (forward direction or rotated direction) set at Step S112 or Step S113 is output to the print-head driving circuit 25, and the print head 10 is electrified. As a result, the print R such as characters, symbols, barcodes and the like read in at Step S105 are printed on a predetermined region (region according to the set print mode) in the cover film 103 based on the print character direction set at Step S112 or Step S113 (forward direction or rotated direction). As a result, the base tape 101 and the cover film 103 having finished with the printing are bonded and integrated by the feeding roller 107 and the sub-roller 109 and formed as the tag label tape 110 with print and fed to the direction outside the cartridge body 100.

After that, at Step S200, tag information reading processing is performed, an inquiry signal for reading is transmitted to the RFID circuit element To, and a reply signal including the RFID tag information is received and read in (for details, see FIG. 16, which will be described later). When Step S200 is finished, the routine goes to Step S125.

At Step S125, it is determined if the flag F=0 or not. If the reading processing has been normally completed, it remains as F=0 (See Step S280 in the flow shown in FIG. 16, which will be described later), and the determination is satisfied and the routine goes to Step S130.

At Step S130, combination of information read out from the RFID circuit element To at Step S200 and the print information already printed by the print head 10 in correspondence is output through the terminal 5 or the general-purpose computer 6 via the input/output interface 31 and the communication line 3 and stored in the information server 7 and the route server 4. The stored data is stored and held in a database, for example, capable of being referred to by the terminal 5 or the general-purpose computer 6 as needed.

After that, the determination at Step S135 is repeated till all the prints on the region in the cover film 103 corresponding to the RFID circuit element To be processed at this time have been finished and after the print is finished, the routine goes to Step S140.

If the reading processing has not been normally completed for some reason at Step S125, it is F=1 (See Step S280 in the flow shown in FIG. 16, which will be described later), and the determination at S125 is not satisfied, the routine goes to Step S137, and a control signal is output to the print-head driving circuit 25 so as to stop electricity to the print head 10 and stop printing. After the fact that the RFID circuit element To is not a non-defective product by print stop as above is clearly displayed, the routine goes to Step S140.

At Step S140, it is determined if the tag label tape 110 with print has been further fed and the cut mark PM on the separation sheet 101d is detected by the photo sensor 19. If the determination is satisfied, the routine goes to Step S145.

At Step S145, according to the detection of the cut mark PM, a control signal is output to the cartridge shaft driving circuit 24 and the tape-feeding-roller driving circuit 29 so as to stop driving of the motor 23 to drive cartridge shaft and the tape-feeding-roller motor 28, and to stop rotation of the ribbon take-up roller 106, the feeding roller 107, and the feeding roller 17. By this operation, the feeding-out of the base tape 101 from the first roll 102, feeding-out of the cover film 103 from the second roll 104, and the feeding of the tag label tape 110 with print by the feeding roller 17 are stopped. Then, a cutting (scheduled) line provided at the separation sheet 101d is located at a position just between blades of the cutter 15 (the arrangement positional relation to realize that is set in advance).

After that, a control signal is output to the solenoid driving circuit 27 at Step S150 so as to drive the solenoid 26, and the tag label tape 110 with print is cut (separated) at the cutting line using the blade of the cutter 15. As a result, the label-state RFID labels Tf, Tb on which the print in a predetermined mode has been made as above are created.

After that, the routine goes to Step S155, where a control signal is output to the tape-feeding-roller driving circuit 29 so as to resume driving of the tape-feeding-roller motor 28 and to rotate the feeding roller 17. By this operation, the feeding by the feeding roller 17 is resumed, and the RFID labels Tf, Tb created in the label state at Step S150 are fed toward the carry-out exit 16 and further discharged from the carry-out exit 16 to outside the apparatus 2.

Then, the routine goes to Step S160, where it is determined whether or not the variable M is two, that is, creation of the RFID label Tf for front cover has been finished. If the variable M is two, the determination is satisfied, that is, creation of the two RFID labels of the RFID label Tb for back cover and the RFID label Tf for front cover is considered to have been finished, and this flow is finished. If the variable M is still one, the determination is not satisfied, that is, it is considered that creation of only the RFID label Tb for back cover has been finished, and the variable M is incremented by one at the subsequent Step S165 and then, the routine returns to Step S111 and the similar procedure is repeated.

The RFID labels Tf, Tb in each mode shown in FIGS. 13C and 13D are created as above.

FIG. 15 is a functional block diagram illustrating functions relating to setting of the print character direction between forward direction and rotated direction among the functions of the control circuit 30.

As shown in FIG. 15, the control circuit 30 has an input portion 30a, a forward-direction print buffer portion 30b, a rotated-direction print buffer portion 30c, a control signal generation portion 30d, and an output portion 30e.

The control circuit 30 is input-operated by an operator through the terminal 5 or the general-purpose computer 6 and takes in the print information read in through the communication line 3 and the input/output interface 31 at Step S105 in FIG. 14 in the forward-direction print buffer portion 30b and the rotated-direction print buffer portion 30c through the input portion 30a.

The forward-direction print buffer portion 30b extends the print information input through the input portion 30a on the buffer in a normal direction and temporarily stores it. On the other hand, the rotated-direction print buffer portion 30c extends the print information input through the input portion 30a on the buffer in a direction rotated by 180° and temporarily stores it. In FIG. 15, a case where a single character of "A" is extended is shown as an example of data on the buffer.

When the print character direction is set to the forward direction in the procedure at Step S112 in FIG. 14, the control signal generation portion 30c reads out the data in the forward-direction print buffer portion 30b and generates a control signal corresponding to the forward direction. On the other hand, when the print character direction is set to the rotated direction in the procedure at Step S113 in FIG. 14, the data in the rotated-direction print buffer portion 30c is read out and a control signal corresponding to the rotated direction is generated.

Then, the forward-direction control signal or the rotated-direction control signal generated at the control signal generation portion 30d is output to the print-head driving circuit 25 through the output portion 30e. By this operation, the print head 10 is electrified so as to correspond with the print in the forward direction or rotated direction, the print R is printed in a predetermined region of the cover film 103 according to the print character direction (forward direction or rotated direction) set by the procedure at Step S112 or Step S113 in FIG. 14.

Here, returning to FIG. 13 mentioned above, since the RFID label Tb shown in FIG. 13C is in a label mode created by printing in the rotated direction, the print is made based on the data in the rotated-direction print buffer portion 30c. That is, in the case of creation of the RFID label Tb shown in FIG. 13C, the print is made based on the print data extended in the rotated direction on the rotated-direction print buffer portion 30c as shown in FIG. 13A. On the other hand, since the RFID label Tf shown in FIG. 13D is in a label mode created by printing in the forward direction, the print is made based on the data in the forward-direction print buffer portion 30b. That is, when the RFID label Tf shown in FIG. 13D is to be created, the print is made based on the print data extended in the rotated direction on the forward-direction print buffer portion 30b as shown in FIG. 13B.

FIG. 16 is a flowchart illustrating a detailed procedure of the above-mentioned Step S200.

In FIG. 16, first, at Step S210, the RFID circuit element To from which information is to be read out is fed and set in the vicinity of the antenna 14.

After that, at Step S220, a control signal is output to the radio frequency circuit 21 and the signal processing circuit 22, an interrogating wave subjected to a predetermined modulation is transmitted as an inquiry signal (a tag ID reading command signal in this example) for acquiring information stored in the RFID circuit element To the RFID circuit element To through the apparatus antenna (the antenna 14d in this example. The same applies to the following), and a reply is prompted.

Next, at step S230, in response to the tag ID reading command signal, the reply signal (including the RFID tag information such as a tag ID) transmitted from the target RFID circuit element To is received through the antenna 14d and taken in through the radio frequency circuit 21 and the signal processing circuit 22.

Next, at Step S240, it is determined whether or not the reply signal received at Step S230 has no error, using a known error detection code (CRC code; Cyclic Redundancy Check or the like).

If the determination is not satisfied, the routine goes to Step S250, where one is added to N and it is determined whether or not N has reached a predetermined number of retry times (five times in this example. Any other number of times may be set as appropriate) at Step S260. In the case of N≦4, the determination is not satisfied but the routine returns to Step S220 and the same procedure is repeated. In the case of N=5, the routine goes to Step S270, where an error display signal is output to the terminal 5 or the general-purpose computer 6 via the input/output interface 31 and the communication line 3 and reading failure (error) display is made, and then, the flag is set at the flag F=1 at Step S280, and this flow is finished. In this way, even if information reading is not successful, retry is made up to a predetermined number of times (five times in this example).

If the determination is satisfied at Step S240, the reading of the RFID tag information from the RFID circuit element To be read out is completed, and this routine is finished.

In the above routine, the RFID tag information in the IC circuit part 151 of the RFID circuit element To be accessed in the cartridge 100 can be accessed and read out. Also, if the RFID tag information in the IC circuit part 151 can not be read out correctly within the predetermined number of times, it is known that the RFID circuit element To is damaged, and it can be determined if the RFID labels Tf, Tb are not defective.

In the above, the procedures executed by the sensor 20 and the control circuit 30 at Step S105 in FIG. 14 constitute the directivity information acquisition portion configured to acquire information on directivity of the tag antenna 152 of the RFID circuit element To provided at the base tape 101 described in each claim.

Step S111, Step S112, and Step S113 in FIG. 14 executed by the control circuit 30 and the print-head driving circuit 25 constitute the print control portion controlling the print head 10 according to the arrangement relation between the tag antenna 152 and the reflector 160 acquired by the sensor 20 and the procedure at Step S105 in FIG. 14. Among them, Step S112 and Step S113 executed by the control circuit 30 constitute the print direction determining portion and the printhead driving circuit 25 constitutes the drive-signal generating device.

The procedures other than Step S111, Step S112, and Step S113 in FIG. 14 executed by the control circuit 30 constitute a second coordination control portion configured to control the feeding roller driving shaft 12, the apparatus antenna 14d and the like in coordination so as to create in a lump sum the RFID label Tb for back cover (first vertical label) with the downstream side in the transport direction as the lower end side of the character string in the vertical print and the RFID label Tf for front cover (second vertical label) with the upstream side in the transport direction as the lower end side of the character string in the vertical print.

As have been described above, in the apparatus 2 for producing RFID label in this embodiment, information transmission and reception is performed via radio communication from the apparatus antennas 14u, 14d to the RFID circuit element To provided at the base tape 101 fed by the feeding-roller driving shaft 12, and the print R is made by the print head 10 on a predetermined print area of the cover film 103 so that the RFID labels Tf, Tb with print are created. At this time, by controlling the print head 10 according to the acquired directivity information (arrangement relation between the tag antenna 152 and the reflector 160) (based on a detection result of the sensor 20 in this example), the print character direction can be matched with the direction where the sensitivity of the tag antenna 152 of the RFID circuit element To included in the RFID labels Tf, Tb is higher in a one-to-one manner in the completed RFID labels Tf, Tb. In the above example, in the vertical print along the transport direction of the feeding-roller driving shaft 12, it is determined whether the downstream side in the transport direction is to be on the lower end side of the character string (FIG. 13A) or the upstream side in the transport direction is to be on the lower end side of the character string (FIG. 13B). By this operation, in the RFID labels Tf, Tb with vertical prints, the direction with the higher sensitivity of the tag antenna 152 of the RFID circuit element To included in the label can be uniquely made to correspond (the higher antenna sensitivity on the left, the higher antenna sensitivity on the right or the like in a state opposed to the print R). Therefore, the RFID labels Tf, Tb can be correctly affixed so that a directivity pattern desired by a user can be obtained without taking a wrong direction. Since the directivity pattern can be visually recognized accurately all the time even after affixation, communication efficiency can be assuredly maintained favorably.

Also, particularly in this embodiment, using the variable M initialized at Step S110, two pieces of RFID labels having the direction with higher sensitivity of the tag antenna 152 located on the side opposite the vertical print, respectively (the RFID label Tf for front cover with the higher antenna sensitivity on the left side of the print, the RFID label Tb for back cover with higher antenna sensitivity on the right side) can be created in a lump sum. As a result, convenience for operators can be improved.

Also, particularly in this embodiment, the arrow Rk indicating the side where the sensitivity is higher is printed on the print region of the RFID labels Tb, Tf according to the directivity information. By this arrangement, the direction with higher sensitivity of the tag antenna 152 of the RFID circuit element To is obvious for users and enables assured recognition. As a result, the RFID labels can be correctly affixed so that a directivity pattern desired by a user can be obtained without taking a wrong direction. The direction with the higher sensitivity of the antenna 152 can be visually recognized accurately all the time even after affixation.

Also, particularly in this embodiment, when the cartridge 100 is attached to the cartridge holder, the lower apparatus antenna 14d is located on the lower side where the sensitivity of the tag antenna 152 provided at the RFID circuit element To of the base tape 101 is higher. By this arrangement, information transmission and reception at label creation can be realized assuredly, and communication reliability is improved.

Also, particularly in this embodiment, the print head 10 is controlled by the procedure at Step S111, Step S112, and Step S113 in FIG. 14 according to the directivity information recorded in the portion 190 to be detected of the cartridge 100. By this operation, in the completed RFID labels Tf, Tb, the character direction is matched in a one-to-one manner with the direction where the sensitivity of the tag antenna 152 of the RFID circuit element To included in the label is higher. By recording the directivity information in the cartridge 100, it is not necessary any more for a user to set and input through operation the directivity direction at label creation. Moreover, correspondence between the character direction and the direction with higher sensitivity of the tag antenna 152 can be prevented from being different from that in the other labels due to a wrong input. The input of the directivity information may be set by an input operation through the terminal 5 or general-purpose computer 6 as the operating device, for example, (or an operating device with an equivalent function may be provided separately in the apparatus 2 for producing RFID label) so that this information is acquired at the control circuit 30 (directivity information acquisition portion). In this case, the portion 190 to be detected and the sensor 20 in the cartridge 100 may be omitted.

In the apparatus for producing RFID labels of this embodiment, both the RFID label Tf for front cover and the RFID label Tb for back cover are created at the same time, but the present invention is not limited to that, only one of them may be created. Particularly at this time, designation may be made to create only one of them through an input operation via the terminal 5 or general-purpose computer 6 as the operating device, for example, (or an operating device with an equivalent function may be provided separately in the apparatus 2 for producing RFID label).

The print character direction is not limited to the vertical print as shown in FIGS. 8, 11, and 13 (with respect to the tape transport direction), but the label with a lateral print may be created. FIGS. 17A, 17B, 17C, and 17D are explanatory diagrams illustrating examples of such a case and correspond to FIGS. 13A, 13B, 13C, and 13D, respectively.

That is, FIGS. 17A and 17B are explanatory diagrams illustrating correspondence between the transport direction and the lateral print character direction (direction of characters to be printed) when a pair of RFID labels Ti, Tj are created using the cartridge 100 shown in FIG. 4 (the reflector 160 is located on the upper side and the tag antenna 152 on the lower side in FIG. 4 of the base tape 101). As above, these figures correspond to arrow views from a G direction in FIG. 3. When the RFID label Ti shown in FIG. 17A is to be created, the print is made so that the downstream side in the tape transport direction is on the stared tip side of the character string of the "Article to Be Managed 1". When the RFID label Tj shown in FIG. 17B is to be created, the print is made so that the upstream side in the tape transport direction is on the stared tip side of the character string of the "Article to Be Managed 1". As mentioned above, the print is made in the mutually opposing arrangement modes for the base tape 101 of the same cartridge 100 between the creation of the RFID label Ti and creation of the RFID label Tj (arrangement mode rotated by 180°). As a result, in the finished state, the pair of RFID labels Ti, Tj with the arrangement of the reflector 160 and the tag antenna 152 in the tape width direction opposite to each other can be created (See FIGS. 17C and 17D). Since the RFID label Ti shown in FIG. 17C created as above has the direction to be detected opposite to the print and oriented downward, the label can be used by being affixed at an upper end portion of the spine label 81a of the document file binder 81 shown in FIG. 12, for example. Since the RFID label Ti shown in FIG. 17D has the direction to be detected opposite the print and oriented upward, the label can be used by being affixed at a lower end portion of the spine label 81a of the document file binder 81 shown in FIG. 12, for example. In these RFID labels Tj, Ti, instead of the arrow Rk of the RFID labels Tf, Tb in FIGS. 13A to 13D, an arc-shaped figure Rk' with which an electric wave can be easily associated is used as a directivity index (directivity sign portion).

In FIG. 4, if the cartridge 100 provided with the base tape 101 in which the reflector 160 is located on the lower side and the tag antenna 152 on the upper side, which is opposite the above, is used (in this case, the upper apparatus antenna 14u is used for communication), it is only necessary to switch the print modes in FIGS. 17A and 17B.

As a control procedure executed by the control circuit 30 at creation of the RFID labels Tf, Tb in the pair of arrangement modes, it is only necessary that the variable M=1 used in the flowchart shown in FIG. 14 is made to correspond to the RFID label Tj shown in FIG. 17D, and the variable M=2 to the RFID label Ti shown in FIG. 17C. Then, the print character direction "forward-direction" set at Step S112 is set so that in the print characters, the downstream side in the tape transport direction comes to the stared tip side of the character string as shown in FIG. 17A. Also, the print character direction "rotated-direction" set at Step S113 is set so that in the print characters, the upstream side of in the tape transport direction comes to the stared tip side of the character string as shown in FIG. 17B. The other procedures in FIG. 14 may remain as they are. In the procedure at Step S105 in FIG. 14, for example, a designation input to select vertical print or lateral print may be made at the same time by an input operation via the terminal 5 or the general-purpose computer 6 as the operating device, for example.

Even in the case of the lateral print as above, Step S111, Step S112, and Step S113 in FIG. 14 executed by the control circuit 30 and the print-head driving circuit 25 constitute the print control portion configured to control the print head 10 according to the arrangement relation between the tag antenna 152 and the reflector 160 acquired by the sensor 20 and in the procedure at Step S105 in FIG. 14. Among them, Step S112 and Step S113 executed by the control circuit 30 constitute print-direction determining portion and the print-head driving circuit 25 constitutes driving-signal generating device.

Also, the procedure other than Step S111, Step S112, and Step S113 in FIG. 14 executed by the control portion 30 constitutes a first coordination control portion configured to control the feeding-roller driving shaft 12, the apparatus antenna 14d and the like in coordination so that the RFID label Ti (first lateral label) with the downstream side in the transport direction as the stared tip side of the character string in the lateral print and the RFID label Tj (second lateral label) with the upstream side in the transport direction as the stared tip side of the character string in the lateral print are created in a lump sum.

In this variation of the lateral print, the same effect as that of the above embodiment is obtained. That is, in the completed RFID labels Tj, Ti, the print character direction and the direction with higher sensitivity of the tag antenna 152 of the RFID circuit element To included in the RFID labels Tj, Ti can be made to correspond to each other in a one-to-one manner. That is, in the lateral print along the transport direction of the feeding-roller driving shaft 12, it is determined whether downstream side in the transport direction is to be the stared tip side of the character string (FIG. 17A) or the upstream side in the transport direction is to be the stared tip side of the character string (FIG. 17B). As a result, in the RFID labels Tj, Ti with lateral prints, the direction with the higher sensitivity of the tag antenna 152 of the RFID circuit element To included in the label can be uniquely made to correspond (the higher antenna sensitivity on the upper side, the higher antenna sensitivity on the lower side or the like in a state opposed to the print R). Therefore, the RFID labels Tj, Ti can be correctly affixed so that a directivity pattern desired by a user can be obtained without taking a wrong direction. Since the directivity pattern can be visually recognized accurately all the time even after affixation, communication efficiency can be assuredly maintained favorably.

Also, using the variable M initialized at Step S110, two pieces of RFID labels having the direction with higher sensitivity of the tag antenna 152 located on the side opposite the lateral print, respectively (the RFID label Tj with the higher antenna sensitivity on the upper side of the print, the RFID label Ti with higher antenna sensitivity on the lower side) can be created in a lump sum. As a result, convenience for operators can be improved. The present invention is not limited to creation of two RFID labels Tj, Ti at the same time but only one of them may be created.

In this embodiment, the RFID circuit element To is provided with the reflector 160 for generating directivity on the other side (upper side in FIG. 4) of the tag antenna 152 in the tape width direction, by which the directivity to one side (lower side in FIG. 4), which is the opposite side, is generated, but not limited to this. That is, as shown in FIG. 18, for example, a wave director 161 (shorter than the entire length of the tag antenna 152 in this example) may be provided instead of the reflector 160. In this case, by the wave director 161 provided on one side (upper side in FIG. 18) of the tag antenna 152 in the tape width direction, the directivity to the one side (upper side in FIG. 18) can be actively generated. Though not particularly shown, the reflector 160 and the wave director 161 may be provided on one side and the other side of the tag antenna 152 in the tape width direction, respectively, and in this case, a so-called Yagi antenna is constructed by the tag antenna 152, the reflector 160, and the wave director 161, and the directivity can be generated with higher gain toward the side where the wave director 161 is provided.

Moreover, as shown in FIG. 19, the RFID circuit element To including the tag antenna 152, the IC circuit part 151, and the wave director 161 may be arranged so that its longitudinal direction is the tape (label) width direction. In this case, the arrow Rk is also made as indication corresponding to that as shown in the figure. In the configuration of the embodiment using the reflector 160 instead of the wave director 161 or in the configuration using the above Yagi antenna provided with the both may have the similar arrangement.

As a print R of the RFID label, as shown in FIG. 20A, a folding line (folding index; printed in a broken line in the illustrated example) L may be printed in a region between the reflector 160 and the tag antenna 152. In this case, by folding a RFID label Tk at folding line L as shown in FIG. 20B, a label portion with the reflector 160 (upper side portion in FIG. 20B) and a label portion with the tag antenna 152 (lower portion in FIG. 20B) can be arranged with a predetermined angle to each other, not in a plane. In this case, the directivity direction can be set in a three-dimensional manner. Also, though not particularly shown, a cutting line (cutting index) may be printed instead of the folding line, and in this case, a user can cut the RFID label at the cutting line so as to separate it for use, and by arranging the separated label pieces so that the separated tag antenna 152 and the reflector 160 are arranged in parallel and in the vicinity (by arranging the surface of each label piece opposed to each other, for example), a direction of directivity can be set in a three-dimensional manner.

In the above, an example of reading/writing and printing of RFID tag information on the base tape 101 being moved has been illustrated, but not limited to that, the base tape 101 and the like is stopped at a predetermined position (or may be held by a predetermined feeding guide for the reading/writing) so that the above printing and reading/writing may be made.

In the above, a case of creation of the RFID label T by cutting with the cutter 16 the tag label tape 110 with print with which print and access to the RFID circuit element To have been finished is described as an example, but not limited to that. That is, when a label mount (so-called die-cut label) separated in advance to a predetermined size corresponding to a label is continuously arranged on a tape fed out of a roll, only the label mount (on which an accessed RFID circuit element To is provided and a corresponding print have been made) is peeled off the tape after the tape is discharged from the carry-out exit 16 so as to create the RFID label T without requiring cutting with the cutter 15, and the present invention may be also applied to this type of arrangement.

In the above, such a method is employed that the print is made on the cover film 103 separate from the base tape 101 as a tag tape provided with the RFID circuit element To and they are bonded together, but not limited to that, a method that a print is made on a print-receiving layer (thermal layer, transfer layer, image-receiving layer) provided at the tag tape (type not to be bonded together) may be applied to the present invention. In this case, the tag tape constitutes a tag medium. Also, the tag tape is constituted by a tape base layer corresponding to the base film 101b, an affixing adhesive layer made of an appropriate adhesive corresponding to the adhesive layer 101c, and a separation material layer corresponding to the separation sheet 101d. The above-mentioned directivity sign portion is provided at the tape base layer 101b.

Moreover, in the above, a case in which the base tape 101 as a tag tape is wound around a reel member so as to constitute a roll, and the roll is arranged in the cartridge 100 and the tag tape is fed out is described as an example, but not limited to that. For example, it may be so configured that a lengthy flat-paper state or strip-state tapes or sheets (including those formed by feeding out the tape wound around the roll and then, by cutting it to an appropriate length) on which at least one RFID circuit element To is arranged are stacked in a predetermined storage portion as a cartridge, the cartridge is attached to the cartridge holder on the side of the apparatus 2 for producing RFID label and transferred and fed from the storage portion, and the print and writing are made so as to produce the RFID labels.

Moreover, configuration to detachably attach the roll directly to the side of the apparatus 2 for producing RFID label or configuration in which the lengthy flat-paper state or strip-state tapes or sheets are transferred one by one from outside the apparatus 2 for producing RFID label by a predetermined feeder mechanism and supplied into the apparatus 2 for producing RFID label are possible. Furthermore, not even limited to the cartridge 100 that can be detachably attached to the side of the apparatus 2 for producing RFID label, the first roll 102 may be provided as a so-called installed type or an integral type that is attached on the side of the main body undetachably. In these cases, too, the same effect as above can be obtained.

Also, the methods according to the embodiments and each variation may be combined as appropriate for use other than those described above.

Though not specifically exemplified, the present invention should be put into practice with various changes made in a range not departing from its gist.

What is claimed is:

1. An apparatus for producing RFID labels comprising:
    a feeding device configured to feed a tag medium in which a RFID circuit element provided with an IC circuit part storing information and a tag antenna having directivity with sensitivity to one side higher than that to the other side;
    a directivity information acquisition portion configured to acquire information relating to said directivity of said tag antenna in said RFID circuit element provided at said tag medium;
    an apparatus antenna for transmission and reception of information with said RFID circuit element via radio communication;
    a printing device configured to make a print on a predetermined print region of said tag medium fed by said feeding device or a print-receiving medium to be bonded to said tag medium; and
    a print control portion configured to control said printing device according to said directivity information acquired by said directivity information acquisition portion.

2. The apparatus for producing RFID labels according to claim 1, wherein:
    said print control portion includes:
    a print direction determining portion configured to determine, in a lateral print or vertical print along a transport direction of said feeding device, to which direction a character direction is oriented with respect to the transport direction according to said directivity information; and
    a driving-signal generating device configured to generate a driving signal corresponding to the character direction determined by said print direction determining portion and output it to said printing device.

3. The apparatus for producing RFID labels according to claim 2, wherein:
    said print direction determining portion determines, in the lateral print along the transport direction of said feeding device, whether a downstream side in the transport direction is to be on a stared tip side of a character string or an upstream side in the transport direction is to be on the stared tip side of the character string according to said directivity information.

4. The apparatus for producing RFID labels according to claim 3, further comprising a first coordination control portion configured to control said feeding device, said apparatus antenna, and said print control portion in coordination with each other so that a first lateral label with the downstream side in the transport direction as the stared tip side of the character string in said lateral print and a second lateral label with the upstream side in the transport direction as the stared tip side of the character string in said lateral print are created in a lump sum.

5. The apparatus for producing RFID labels according to claim 2, wherein:
    said print direction determining portion determines, in the vertical print along the transport direction of said feeding device, whether a downstream side in the transport direction is to be on a lower end side of a character string or an upstream side in the transport direction is to be on the lower end side of the character string according to said directivity information.

6. The apparatus for producing RFID labels according to claim 5, further comprising a second coordination control portion configured to control said feeding device, said apparatus antenna, and said print control portion in coordination with each other so that a first vertical label with the downstream side in the transport direction as the lower end side of the character string in said vertical print and a second vertical label with the upstream side in the transport direction as the lower end side of the character string in said vertical print are created in a lump sum.

7. The apparatus for producing RFID labels according to claim 1, wherein:
said print control portion configured to control said printing device so that a directivity index indicating said one side where said sensitivity is higher is printed according to said directivity information.

8. The apparatus for producing RFID labels according to claim 1, wherein:
said directivity information is acquired on a basis of an operation signal of an operating device for manually input of said directivity information.

9. The apparatus for producing RFID labels according to claim 1, further comprising a cartridge holder to which a cartridge for including at least a RFID tag capable of continuous supply of said tag medium on which said RFID circuit element is arranged can be detachably attached.

10. The apparatus for producing RFID labels according to claim 9, wherein:
said apparatus antenna is arranged near said cartridge holder so that said apparatus antenna is located on said one side where said sensitivity of said tag antenna provided at said RFID circuit element of said tag medium is higher when said cartridge for including at least the RFID tag is attached to said cartridge holder.

11. The apparatus for producing RFID labels according to claim 9, wherein:
said directivity information acquisition portion acquires said directivity information on the basis of information recorded in a directivity information recording portion of said cartridge for including at least the RFID tag attached to said cartridge holder.

12. The apparatus for producing RFID labels according to claim 1, wherein:
said feeding device feeds said tag medium on which said RFID circuit element provided with a dipole antenna in which an antenna element is extended to the side of the transport direction of said tag medium from IC circuit part as said tag antenna.

13. The apparatus for producing RFID labels according to claim 12, wherein:
said print control portion controls said printing device so that a folding index or cutting index is printed in a region between a wave director or a reflector and said tag antenna.

14. A RFID label comprising:
a tape base layer including a RFID circuit element provided with an IC circuit part storing information and a tag antenna having directivity with sensitivity to one side higher than that to the other side;
an affixing adhesive layer for affixing said tape base layer to an affixed face; and
a directivity indicator on which a directivity index indicating said one side where said sensitivity is higher is printed, said directivity indicator being provided in said tape base layer or a print-receiving tape layer bonded to said tape base.

* * * * *